US011552524B2

(12) United States Patent
Brinkmann et al.

(10) Patent No.: US 11,552,524 B2
(45) Date of Patent: Jan. 10, 2023

(54) STATOR MODULE

(71) Applicant: Beckhoff Automation GmbH, Verl (DE)

(72) Inventors: Rolf Brinkmann, Bad Salzuflen (DE); Lukas Bentfeld, Delbrück (DE); Uwe Pruessmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 322 days.

(21) Appl. No.: 16/892,681

(22) Filed: Jun. 4, 2020

(65) Prior Publication Data
US 2020/0304007 A1  Sep. 24, 2020

Related U.S. Application Data
(63) Continuation of application No. PCT/EP2018/085605, filed on Dec. 18, 2018.

(30) Foreign Application Priority Data
Dec. 27, 2017 (DE) ...................... 10 2017 131 326.5

(51) Int. Cl.
*H02K 41/00* (2006.01)
*H02K 11/33* (2016.01)
(Continued)

(52) U.S. Cl.
CPC .............. *H02K 5/225* (2013.01); *H02K 5/22* (2013.01); *H02K 11/30* (2016.01); *H02K 11/33* (2016.01);
(Continued)

(58) Field of Classification Search
CPC ...... H02K 41/031; H02K 41/00; H02K 41/02; H02K 41/03; H02K 11/33; H02K 2201/18;
(Continued)

(56) References Cited

U.S. PATENT DOCUMENTS 4,126,797 A  11/1978 Kling
4,458,227 A   7/1984 Petersen
(Continued)

FOREIGN PATENT DOCUMENTS

CN    102223121 A    10/2011
CN    102804560 A    11/2012
(Continued)

OTHER PUBLICATIONS

International Preliminary Report on Patnetability dated Jan. 4, 2020 for PCT/EP2018/085605, 26 pages including English translation.
(Continued)

*Primary Examiner* — Alexander A Singh
(74) *Attorney, Agent, or Firm* — Dorsey & Whitney LLP

(57) ABSTRACT

A stator module for driving a rotor of an electrical planar-drive system comprises a power module, a stator assembly arranged on a top surface of the power module, and a connector. The power module is embodied to provide drive currents for driving the rotor. The stator assembly comprises coil conductors electrically connected to the power module via the connector for charging with the drive currents. The power module and the stator assembly each have a plate-shaped embodiment. The power module is mechanically fastened to the stator assembly by the connector. The stator assembly comprises a contact structure with contact holes arranged side by side, and the power module comprises a connecting arrangement with further contact holes arranged side by side. The connector comprises contact pins arranged side by side to engage in the further contact holes of the connecting arrangement, and in the contact holes of the contact structure.

19 Claims, 18 Drawing Sheets

(51) Int. Cl.
*H02K 5/22* (2006.01)
*H02K 41/03* (2006.01)
*H02K 11/30* (2016.01)

(52) U.S. Cl.
CPC .......... *H02K 41/00* (2013.01); *H02K 41/031* (2013.01); *H02K 2201/18* (2013.01)

(58) Field of Classification Search
CPC .......... H02K 11/30; H02K 5/22; H02K 5/225; H02P 8/00; H02P 25/066; H02N 15/00; G05B 2219/1469; G05B 2219/45006; G05B 2219/24092
USPC ......... 310/12.01, 12.02, 12.03, 12.04, 12.05, 310/12.06, 12.11, 12.13, 12.15, 68 R, 71
See application file for complete search history.

(56) References Cited

U.S. PATENT DOCUMENTS

| | | | |
|---|---|---|---|
| 6,226,073 | B1 | 5/2001 | Emoto |
| 6,353,273 | B1 | 3/2002 | Heshmat et al. |
| 7,135,827 | B1 | 11/2006 | Lampson |
| 9,202,719 | B2 | 12/2015 | Lu et al. |
| 10,116,195 | B2 | 10/2018 | Lu |
| 11,038,410 | B2 | 6/2021 | Brinkmann et al. |
| 2003/0192686 | A1 | 10/2003 | Hisai et al. |
| 2006/0220478 | A1 | 10/2006 | Emoto |
| 2012/0098391 | A1 | 4/2012 | Yamasaki et al. |
| 2012/0156898 | A1* | 6/2012 | Kallee ................. H01R 12/523 439/65 |
| 2012/0307476 | A1 | 12/2012 | Masuzawa et al. |
| 2013/0164687 | A1* | 6/2013 | Binnard ................. H02K 9/22 355/30 |
| 2013/0278087 | A1 | 10/2013 | Kimiabeigi |
| 2014/0062236 | A1 | 3/2014 | Taniguchi et al. |
| 2014/0285122 | A1 | 9/2014 | Lu et al. |
| 2015/0369216 | A1 | 12/2015 | Kisovec |
| 2016/0099623 | A1* | 4/2016 | Böhm et al. ......... H01R 12/585 310/43 |
| 2016/0241173 | A1 | 8/2016 | Prussmeier et al. |
| 2016/0254722 | A1* | 9/2016 | Yamamoto ............ H02K 11/20 310/71 |
| 2017/0163140 | A1 | 6/2017 | Lu |
| 2017/0179805 | A1* | 6/2017 | Lu ........................... H02P 8/00 |
| 2017/0179806 | A1 | 6/2017 | Lu |
| 2018/0205304 | A1 | 7/2018 | Lu |
| 2018/0212505 | A1 | 7/2018 | Ding |
| 2020/0303997 | A1 | 9/2020 | Brinkmann et al. |
| 2020/0304008 | A1 | 9/2020 | Brinkmann et al. |
| 2020/0304009 | A1 | 9/2020 | Brinkmann et al. |
| 2020/0304010 | A1 | 9/2020 | Brinkmann et al. |
| 2020/0321846 | A1 | 10/2020 | Brinkmann et al. |
| 2021/0091621 | A1 | 3/2021 | Brinkmann et al. |
| 2021/0091622 | A1 | 3/2021 | Brinkmann et al. |
| 2021/0184612 | A1 | 6/2021 | Prüssmeier |
| 2022/0131426 | A1 | 4/2022 | Prüssmeier |

FOREIGN PATENT DOCUMENTS

| | | |
|---|---|---|
| CN | 106464089 A | 2/2017 |
| DE | 102005002038 A1 | 7/2006 |
| DE | 102009021730 A1 | 11/2010 |
| DE | 102018117981 A1 | 1/2020 |
| DE | 102019117430 A1 | 12/2020 |
| DE | 102019117431 A1 | 12/2020 |
| GB | 2505782 A | 3/2014 |
| JP | H09131044 A | 5/1997 |
| JP | 2016163415 A | 9/2016 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2017156516 A1 | 9/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |
| WO | 2020260566 A1 | 12/2020 |

OTHER PUBLICATIONS

Examination Report dated Oct. 30, 2018 for German Patent Application No. 102017131326.5, 12 pages with English translation.
International Search Report and Written Opinion dated Mar. 21, 2019 for PCT/EP2018,085605, 28 pages including English translation.

* cited by examiner

STATOR MODULE

CROSS-REFERENCE TO RELATED APPLICATIONS

This application is a continuation of International Patent Application PCT/EP/2018/085605, entitled STATOR MODULE, which claims the priority of German Patent Application DE 10 2017 131 326.5, filed Dec. 27, 2017, entitled STATORMODUL, each of which is incorporated by reference herein, in the entirety and for all purposes.

FIELD

The present invention relates to a stator module for driving a rotor of an electric planar-drive system.

BACKGROUND

Planar-drive systems may be used, inter alia, in automation technology, in particular in production engineering, handling technology and process engineering. Planar-drive systems may be used to move or position a moving element of a plant or machine in at least two linearly independent directions. Planar-drive systems may comprise a permanently energized electromagnetic planar motor having a planar stator and a rotor movable in at least two directions on the stator.

In a permanently energized electromagnetic planar motor, a driving force is exerted onto the rotor by current-carrying conductors magnetically interacting with drive magnets of a magnet arrangement. In Planar-drive systems the drive magnets of an electric planar motor may be arranged at the rotor and the current-carrying conductors of the planar motor may be arranged in a stationary planar stator.

In such a drive system, the rotor comprises at least a first magnet unit for driving the rotor in a first direction and a second magnet unit for driving the rotor in a second direction which is linearly independent from the first direction, for example in a second direction orthogonal to the first direction. The planar stator comprises at least a group of first energizable conductors which magnetically interact with the magnets of the first magnet unit to drive the rotor in the first direction, and a group of second energizable conductors which magnetically interact with the magnets of the second magnet unit to drive the rotor in the second direction. The first and the second group of conductors are generally independently energizable to allow for independent movement of the rotor in the first and second direction. If the conductors of the first and second group may themselves be energized independently from each other at least in part, several rotors may be moved independently from each other on one stator at the same time.

The stator of such planar-drive systems may in particular have a modular embodiment and comprise several stator modules arranged next to each other. Within the stator modules, the current-carrying conductors of the stator may be arranged in a stator assembly. The drive currents required to drive the rotor may be generated by power-generating units which are respectively arranged at the bottom sides of the stator assemblies opposite to the rotor. The power-generating units are then electrically connected to the conductors of the stator assembly in a conductive manner in order to feed the drive currents generated by the power-generating units into the conductors of the stator assembly. In order to be able to transmit sufficient force to the rotor, high-power drive currents have to be generated at times. This may lead to high resistance losses in the current-carrying conductors and thus result in a strong heating of the stator.

The publications WO 2013/059934 A1, WO 2015/017933 A1, WO 2015/179962 A1, WO 2015/184553 A1, WO 2015/188281 A1, WO 2017/004716 A1 each disclose planar-drive systems (displacement devices) which comprise an electromagnetic planar motor with a permanently energized rotor and a stator comprising several energizable conductors.

SUMMARY

The present invention provides a stator module for an electric planar-drive system.

According to an aspect, a stator module for driving a rotor of an electric planar-drive system comprises a power module, a stator assembly disposed on an upper side of the power module, and a connector. The power module is embodied to provide drive currents to drive the rotor. The stator assembly comprises coil conductors which may be charged with the drive currents. The coil conductors of the stator assembly are electrically conductively connected to the power module via the connector for the application of the drive currents. The power module and the stator assembly are each plate-shaped. The power module is mechanically fastened to the stator assembly by the connector. The stator assembly comprises a contact structure with contact holes arranged side by side. The power module comprises a connecting arrangement having further contact holes arranged side by side. The connector comprises contact pins arranged side by side. The contact pins are arranged to engage in the further contact holes of the connecting arrangement of the power module and in the contact holes of the contact structure of the stator assembly.

According to a further aspect, a stator module for driving a rotor of an electric planar-drive system comprises a power module, a stator assembly disposed on an upper side of the power module, and a connector. The power module is embodied to provide drive currents to drive the rotor. The stator assembly comprises coil conductors which may be charged with the drive currents. The coil conductors of the stator assembly are electrically conductively connected to the power module via the connector for the application of the drive currents. The power module and the stator assembly are each plate-shaped. The power module is mechanically fastened to the stator assembly by the connector. The power module is cross-shaped having a first bar extending along the first direction and with a second bar extending along the second direction. The stator assembly comprises a cross-shaped contact arrangement. The power module comprises a cross-shaped connecting arrangement. The connector extends in an elongated manner along the first direction and the second direction. The connector are arranged to engage in the connecting arrangement of the power module and in the contact arrangement of the stator assembly.

EXAMPLES

A stator module for driving a rotor of an electric planar-drive system comprises a power module, a stator assembly arranged on an upper side of the power module and a connector. The power module is embodied to provide drive currents to drive the rotor. The stator assembly comprises coil conductors which may be charged by the drive currents, wherein the coil conductors of the stator assembly are electrically connected to the power module in a conductive manner by the connector in order to be charged with the drive currents. The power module and the stator assembly each have the shape of a plate. The power module is mechanically fastened to the stator assembly by the connector. The stator assembly comprises a contact structure with contact holes arranged side by side and the power module comprises a connecting arrangement with further contact holes arranged side by side. The connector comprises contact pins arranged side by side and the contact pins are arranged to engage in the further contact holes of the connecting arrangement of the power module and in the contact holes of the contact structure of the stator assembly.

By fastening the power module to the stator assembly via a connector comprising contact pins, on the one hand a mechanically rigid connection may be realized between the power module and the stator assembly. On the other hand, the connection via the contact pins may be made flexible enough to compensate for thermal distortions between the stator assembly and the power module. In addition, by the contact pins of the connector, a particularly short connection may be realized between the power module and the stator assembly.

In a further embodiment of the stator module, the stator assembly is fastened to the power module at a distance by the connector in such a way that on the upper side of the power module an installation space is formed between the power module and the stator assembly for arranging electronic components. In this way, the power module may be fitted with electronic components, in particular with integrated circuits, both on the upper side and on a bottom side opposite to the upper side of the power module, and a large number of electronic components may be arranged on the power module.

In a further embodiment of the stator module, the connector is embodied as a press-fit connector that may be pressed into the contact holes of the contact structure of the stator assembly. This allows for a particularly easy arrangement of stator assembly and power module. In addition, when assembling the stator assembly and power module, no soldered connections need to be carried out on the stator assembly, which in case of a high thermal capacity of the coil conductors of the stator assembly could only be realized involving a lot of time and effort.

In a further embodiment of the stator module, the power module comprises a pressing surface arranged along the further contact holes and free of electronic components on a bottom side of the power module opposite to the upper side of the power module. A pressing tool may be applied to the pressing surface during the fastening of the power module to the stator assembly. In particular, the power module may be fastened to the stator assembly in the already fitted state.

In a further embodiment of the stator module, the stator module comprises a further connector, wherein the further connector extends along a first direction in an elongated manner and comprises contact pins arranged next to one another along the first direction. The connector extends along a second direction different from the first direction in an elongated manner and the contact pins of the connector are arranged side by side along the second direction. This on the one hand allows for the power module to be fastened to the stator assembly in a particularly stable manner, and on the other hand coil conductors extending along both the first and the second direction may be charged with drive currents in a simple manner.

In a further embodiment of the stator module, the first direction and the second direction are perpendicular to each other. For example, in addition to the coil conductors, the stator module may include further coil conductors that extend along the second direction. A vertical arrangement of the first and second direction allows for charging the coil conductors extending along the first direction with drive currents by the connector and for charging the further coil conductors extending along the second direction by the further connector.

In a further embodiment of the stator module, the stator assembly includes further coil conductors for charging further drive currents. The coil conductors extend in the first direction in an elongated manner and are arranged next to each other in the second direction and the further coil conductors extend in the second direction in an elongated manner and are arranged next to each other in the first direction. The power module is electrically connected to the coil conductors in a conductive manner via the connector extending along the second direction for feeding the drive currents to the coil conductors. In addition, the power module for feeding the further drive currents into the further coil conductors is electrically connected to the further coil conductors in a conductive manner by the further connector extending along the first direction.

In particular, the coil conductors on the one hand and the further coil conductors on the other hand may each be connected to the power module via a connector which is arranged perpendicular to the extension of the respective coil conductors. In this way, the drive currents may be fed to the coil conductors and to the other coil conductors particularly easily. The rotor may be driven in the second direction by the coil conductors charged with the drive currents and in the first direction by the other coil conductors charged with the other drive currents. In particular, the rotor may be independently driven in the first and in the second direction.

In a further embodiment of the stator module, the power module is cross-shaped with a first bar extending along the first direction and a second bar extending along the second direction, wherein the contact pins of the connector are arranged along the second direction at the second bar and connected to the second bar, and wherein the contact pins of the further connector are arranged along the first direction at the first bar and connected to the first bar. As a result, the power module may be embodied in a particularly space-saving manner. In addition, in a cross-shaped power module free spaces may easily be formed on a bottom side of the stator assembly facing the power module, the free spaces not being covered by the power module. The free spaces may be used to dissipate heat from the stator assembly in a particularly simple manner.

In a further embodiment of the stator module, the connector is arranged in the middle of the second bar in the first direction and the further connector is arranged in the middle of the first bar in the second direction. This means that the power module may be particularly narrow in both the first and second direction and the free spaces may be embodied in a particularly large manner. This makes it possible to dissipate a particularly large amount of heat from the bottom side of the stator assembly.

In a further embodiment of the stator module, the power module comprises a first module unit and a second module unit formed separately from the first module unit, the second bar comprising the first module unit and the first bar comprising the second module unit. The first module unit is fastened to the stator assembly by the connector and the second module unit is fastened to the stator assembly by the further connector.

As a result, the first module unit and the second module unit may be connected to the stator assembly separately from each other and successively during the manufacture of the stator module. This allows for a particularly simple connection of the power module to the stator assembly. In particular, it may be avoided that the power module has to be simultaneously connected to the connector extending along the second direction and to the further connector extending along the first direction, which may result in tilting.

In a further embodiment of the stator module, the power module comprises first power-generating units arranged on the first module unit and second power-generating units arranged on the second module unit. In addition, the stator module comprises a control module, wherein the control module is embodied to generate first control signals for driving the first power-generating units and second control signals for driving the second power-generating units. The first module unit is connected to the control module via a first coupling element for transmitting the first control signals, and the second module unit is connected to the control module via a second coupling element for transmitting the second control signals.

By transmitting the first control signals and the second control signals from the control module to the module units of the power module via coupling elements which are embodied separately from one another, the power-generating units on the power module may be controlled independently from each other without the control signals between the module units having to be transmitted from one module unit to the other module unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention relates to further developments of the planar-drive systems disclosed in the publications WO 2013/059934 A1, WO 2015/017933 A1, WO 2015/179962 A1, WO 2015/184553 A1, WO 2015/188281 A1 and WO 2017/004716 A1. The disclosure content of each of these publications is fully incorporated by reference herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
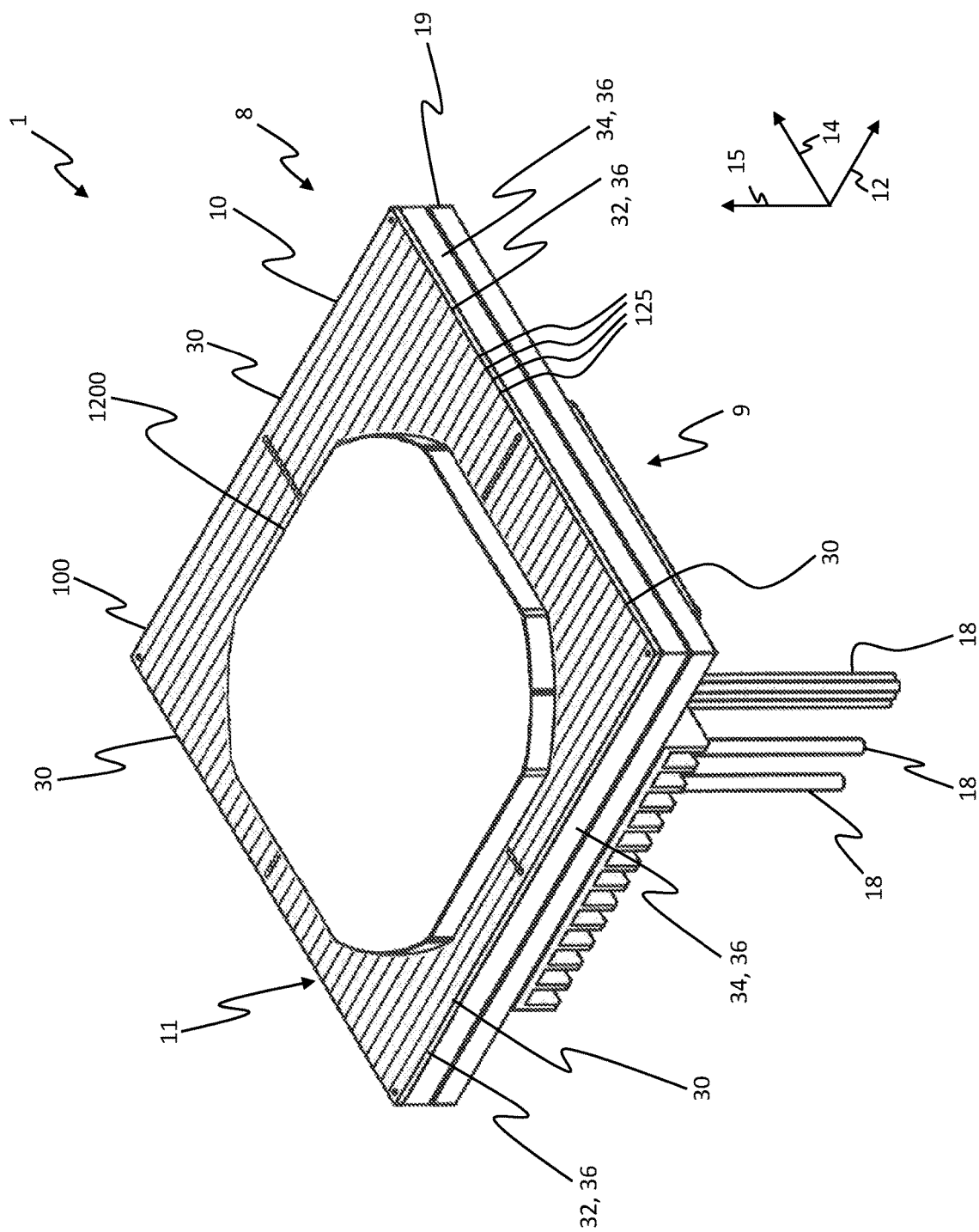
FIG. 1 shows a planar-drive system with a stator module and a rotor.

FIG. 1 shows a planar-drive system 1 with a stator module 10 and a rotor 1200. The stator module 10 comprises a module housing 19 and a stator assembly 100. The stator module 10 has an upper side 8 and a bottom side 9 opposite to the upper side 8. The stator assembly 100 is located above the module housing 19 and on the upper side 8 of the stator module 10 in a vertical direction 15 oriented from the bottom side 9 to the upper side 8. The stator assembly 100 is embodied as a planar stator and has a flat, i.e. planar, stator surface 11 on the upper side 8 of the stator module 10. At the same time, the stator surface 11 forms a surface of the stator module 10.

The stator surface 11 is oriented perpendicularly to the vertical direction 15 and extends over the entire upper side 8 of the stator assembly 100 and of the stator module 10. The stator assembly 100 comprises at least one coil conductor 125 on the stator surface 11 which may be supplied with a drive current. As shown, the stator assembly 100 may comprise a plurality of coil conductors 125 on the stator surface 11. The coil conductors 125 may each be charged with a drive current. By the drive currents in the coil conductors 125, a magnetic field may be generated which drives the rotor 1200 in interaction with the drive magnets of the rotor 1200. The rotor 1200 and the stator assembly 100 with the current-carrying coil conductors 125 form an electromagnetic planar motor.

In the stator module 10, the coil conductors 125 extend in a first direction 12 in an elongated manner and are arranged next to each other in a second direction 14 which is linearly independent from the first direction 12, particularly in a second direction 14 which is perpendicular to the first direction 12. The coil conductors 125 may e.g. be formed as shown as conductor strips extending in an elongated manner in the first direction 12 and be arranged side by side in the second direction 14. In alternative embodiments of the stator module 10, the coil conductors 125 may e.g. also be formed as wires extending in the first direction 12 and arranged next to each other in the second direction 14.

In operation, the rotor 1200 is movably arranged above the stator surface 11 of the stator module 10 and may be driven in the first direction 12, in the second direction 14 and in the vertical direction 15. The first direction 12 and the second direction 14 are each oriented in parallel to the stator surface 11 and perpendicular to the vertical direction 15. By driving the rotor 1200 in the first direction 12 as well as in the second direction 14, the rotor 1200 may be driven above the stator surface 11 in any desired direction. The rotor 1200 may be kept floating above the stator surface 11 during operation, e.g. by magnetic interaction between the drive magnets and suitable drive currents in the coil conductors 125. Apart from driving the rotor 1200 in the first and second directions 12, 14, it is also possible to drive it in the third vertical direction 15.

The stator surface 11 has a rectangular embodiment. In particular, the stator surface 11 may have a square embodiment, as shown. The stator surface 11 is limited by four straight outer edges 30. Two opposite outer edges 30 are oriented in parallel to the first direction 12 and two opposite outer edges 30 are oriented in parallel to the second direction 14.

The stator assembly 100 has a plate-shaped embodiment. An extension of the stator assembly 100 in the vertical direction 15 is smaller than an extension of the stator assembly 100 in the first and second directions 12, 14. Thus, the stator assembly 100 forms a flat cuboid extending in the first and the second direction 12, 14 or a plate extending in the first and second directions 12, 14. Between the stator surface 11 and a bottom side of the stator assembly 100 opposite to the stator surface 11, the stator assembly 100 has four flat side faces 32 which are flush with the outer edges 30 of the stator surface 11 at the stator surface 11. The side faces 32 of the stator assembly 100 are aligned perpendicular to the stator surface 11.

Like the stator surface 11 and the stator assembly 100, the module housing 19 has a rectangular embodiment in a top view onto the stator surface 11. The module housing 19 has a square embodiment, particularly in a top view onto the stator surface 11. The module housing 19 is embodied as a flat cuboid or, respectively, as a plate, the extension of the module housing 19 in the vertical direction 15 being smaller than in the first and second directions 12, 14. An upper side of the module housing 19 facing the stator assembly 100 is arranged adjacent to the bottom side of the stator assembly 100. In the first and second direction 12, 14, the stator assembly 100 and the module housing 19 have essentially the same dimensions.

Between the upper side of the module housing 19 facing the stator assembly 100 and a bottom side of the module housing 19 opposite to the upper side, the module housing 19 has four flat side faces 34. As shown, the side faces 34 of the module housing 19 may be oriented perpendicularly to the stator surface 11. The side faces 34 of the module housing 19 may be aligned flush with the side faces 32 of the stator assembly 100 and be arranged adjacent to the side faces 32 of the stator assembly 100. In an alternative embodiment of the stator module 10, the side faces 34 of the module housing 19 may also be arranged opposite to the side faces 32 of the stator assembly 100 and set back into the interior of the stator module 10. In another alternative embodiment, the side faces 34 of the module housing 19 may also be arranged on the upper side of the module housing 19 adjacent to the side faces 32 of the stator assembly 100 and may taper towards the vertical direction 15 towards the bottom side of the module housing 19 in the direction of the interior of the stator module 10.

The stator module 10 has a rectangular embodiment in a top view onto the stator surface 11. The stator module 10 has four flat side faces 36 between the stator surface 11 located at the upper side 8 of the stator module 10 and the bottom side 9 of the stator module 10 opposite to the upper side 8. The side faces 36 of the stator module 10 are formed in the area of the stator assembly 100 by the side faces 32 of the stator assembly 100 and in the area of the module housing 19 by the side faces 34 of the module housing 19.

The side faces 36 of the stator module 10 thus end at the stator surface 11 with the outer edges 30 of the stator surface 11 and the outer edges 30 of the stator surface 11 also form outer edges of the stator module 10 at the stator surface 11. In particular, the stator surface 11 extends in the first direction 12 and in the second direction 14 in each case between two of the side faces 36 of the stator module 10 and the outer edges 30 limit the extension of the stator surface 11, the stator assembly 100 and the stator module 10 at the side faces 36 of the stator module 10 in the first direction 12 and in the second direction 14.

The side faces 36 of the stator module 10 may each be aligned perpendicular to the stator surface 11 as shown. In alternative embodiments of the stator module 10, the side faces 36 of the stator module 10 in the area of the module housing 19 may also be set back in the direction of the interior of the stator module 10 or taper from the upper side 8 towards the bottom side 9 in the direction of the interior of the stator module 10.

While the stator module 10 is flat on its surface formed by the stator surface 11, the stator module 10 may not be flat or, respectively, uneven at the bottom side 9 of the stator module 10 opposite to the stator surface 11. In particular, further components may be arranged at the bottom side 9 of the stator module 10 or at the bottom side of the module housing 19. In the first direction 12 or in the second direction 14, these further components reach up to the outer edges 30 of the stator assembly 100, at most, so that the further components do not protrude over the outer edges 30 of the stator assembly 100 in the first or second direction 12, 14.

At the bottom side of the module housing 19, connections are arranged for connecting the stator module 10 with several connecting lines 18. The connecting lines 18 may e.g. comprise an input line of a data network, an output line of the data network and a power supply line for supplying the stator module 10 with electrical energy. In particular, via the power-supply line the stator module 10 may be supplied with electrical energy for generating the drive currents. The stator module 10 may be connected to a control unit of the planar-drive system via the data network and exchange control data for controlling the rotor 1200 with the control unit.

The stator surface 11 may have an extension between 100 mm and 500 mm in the first direction 12, in particular between 120 mm and 350 mm, particularly 240 mm. In the second direction 12, the stator surface 11 may have an extension between 100 mm and 500 mm, particularly between 120 mm and 350 mm, particularly 240 mm. The stator module 10 may have an extension in the vertical direction 15 between 10 mm and 100 mm, particularly between 15 mm and 60 mm, particularly 30 mm. The module housing 19 may have an extension in the vertical direction 15 between 8 mm and 80 mm, in particular between 13 mm and 55 mm, in particular 26 mm or 27 mm. In the first and/or second direction 12, 14 the module housing 19 may have the same extension as the stator surface 11.

Several models of the stator module 10 may be arranged next to one another in such a way that the outer edges 30 of adjacent stator modules 10 abut on one another and the stator surfaces 11 of the stator modules 10 form a contiguous working surface over which the rotor 1200 may be moved without interruption. Since the side faces 36 of the stator module 10 are flush with the stator surface 11 at the outer edges 30, the stator surfaces 11 of two adjacent stator modules 10 may abut on one another almost seamlessly by arranging the stator modules 10 with adjacent side faces 32 of the stator assemblies 100 or adjacent outer edges 30 of the stator surfaces 11.

Figure 2:
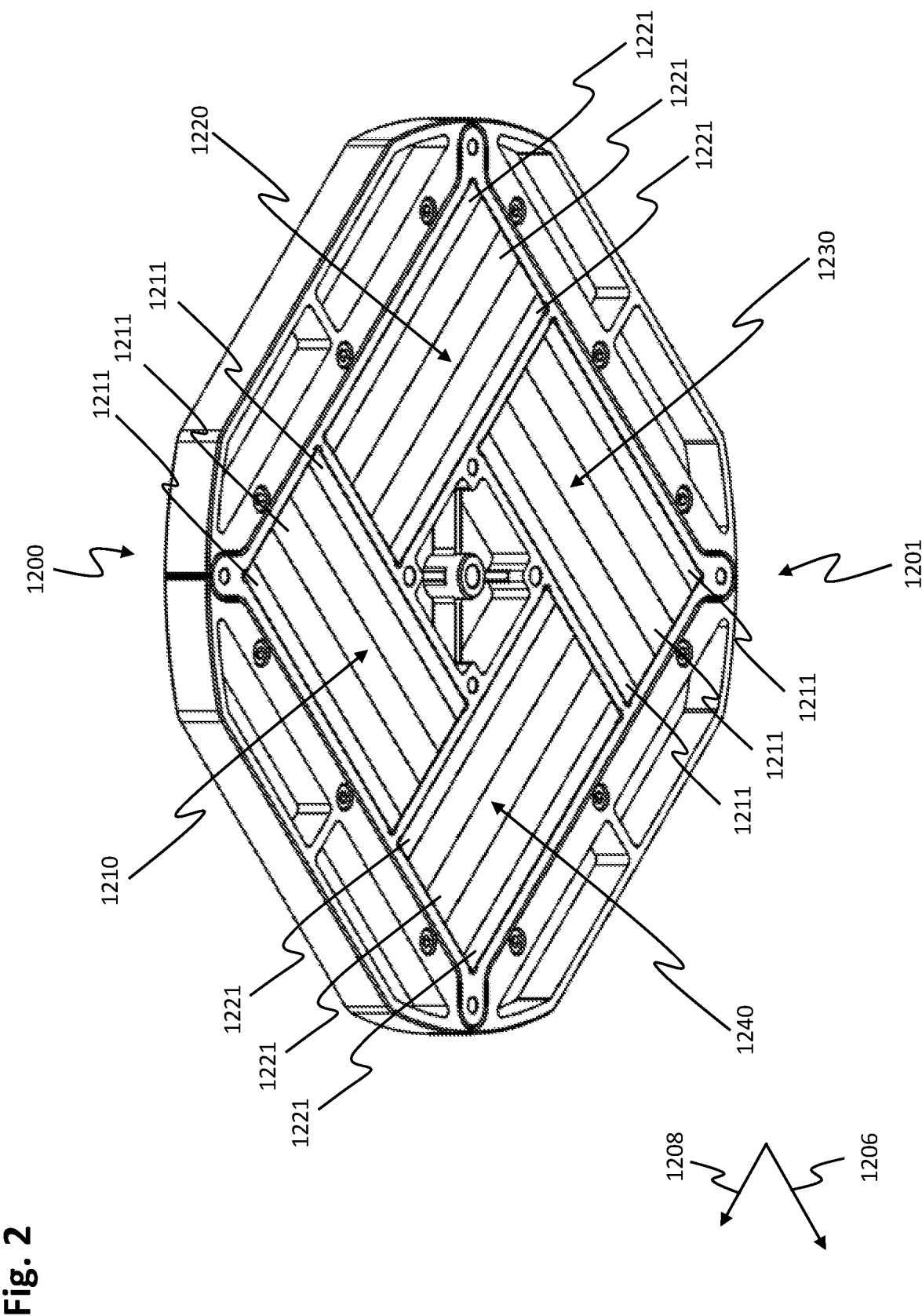
FIG. 2 shows the rotor of the planar-drive system having a magnet arrangement.

FIG. 2 shows the rotor 1200 of the planar-drive system 1 in a view from below onto a bottom side of the rotor 1200. In operation of the planar-drive system 1, the bottom side of the rotor 1200 is arranged facing the stator surface 11 of the stator module 10. The rotor 1200 has a magnet arrangement 1201 on the bottom side. The magnet arrangement 1201 is rectangular, particularly square, and comprises a plurality of magnets. The bottom side of the rotor 1200 is flat or planar, particularly in the area of the magnets of magnet arrangement 1201. During operation, the bottom side of the rotor 1200 with the magnet arrangement 1201 is oriented essentially in parallel to the stator surface 11 and is arranged facing the stator surface 11.

The magnet arrangement 1201 comprises a first magnet unit 1210, a second magnet unit 1220, a third magnet unit 1230 and a fourth magnet unit 1240. The first magnet unit 1210 and the third magnet unit 1230 each have drive magnets 1211 which extend in an elongated manner in a first rotor direction 1206 and are arranged next to one another along a second rotor direction 1208 which is perpendicular to the first rotor direction 1206. In particular, the first and third magnet units 1210, 1230 may each have three drive magnets 1211. The second magnet unit 1220 and the fourth magnet unit 1240 each have further drive magnets 1221 arranged side by side in the first rotor direction 1206 and extending in an elongated manner along the second rotor direction 1208. In operation, the first and third magnet units 1210, 1230 are used to drive the rotor 1200 in the second direction 1208 and the second and fourth magnet units 1220, 1240 are used to drive the rotor 1200 in the first direction 1206. The drive magnets 1211 of the first and third magnet units 1210, 1230 and the further drive magnets 1221 of the second and fourth magnet units 1220, 1240 are each magnetized perpendicularly to the first and second direction of travel 1206, 1208.

Figure 3:
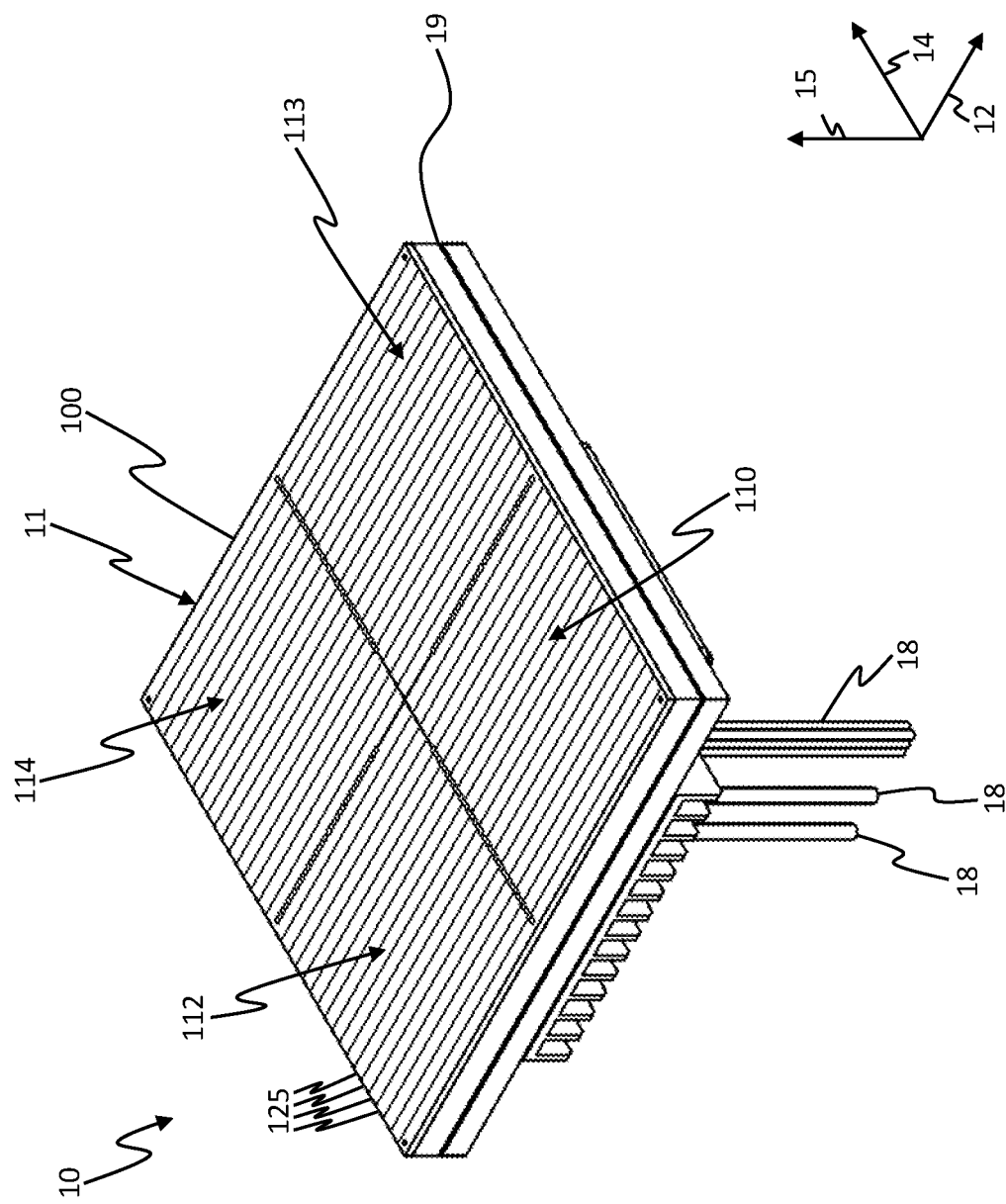
FIG. 3 depicts a perspective view of the stator module of the planar-drive system.

FIG. 3 shows the stator module 10 of the planar-drive system 1 in a perspective view without the rotor 1200. The stator assembly 100 of stator module 10 comprises a first stator sector 110, a second stator sector 112, a third stator sector 113 and a fourth stator sector 114. The stator sectors 110, 112, 113, 114 each in turn comprise a part of the coil conductors 125 arranged on the stator surface 11 of the stator assembly 100. Each of the coil conductors 125 on the stator surface 11 is entirely arranged in one of the stator sectors 110, 112, 113, 114. The stator sectors 110, 112, 113, 114 have a rectangular embodiment. In particular, the stator sectors 110, 112, 113, 114 may have a square embodiment so that an extension of the stator sectors 110, 112, 113, 114 in the first direction 12 corresponds to an extension of the stator sectors 110, 112, 113, 114 in the second direction 14.

The stator sectors 110, 112, 113, 114 are arranged in the first direction 12 in two adjacent rows and in the second direction 14 also in two adjacent rows in an adjacent manner with regard to one another. The stator sectors 110, 112, 113, 114 of adjacent rows are arranged adjacent to one another, as well. In the first direction 12, the stator assembly 100 comprises a row with the second stator sector 112 and the first stator sector 110 and a further row with the fourth stator sector 114 and the third stator sector 113. In the second direction 14, the stator assembly 100 comprises a row with the first stator sector 110 and the third stator sector 113 and a further row with the second stator sector 112 and the fourth stator sector 114.

The stator sectors 110, 112, 113, 114 each have an extension in the first direction 12 and in the second direction 14 which is half as large as an extension of the stator assembly 100 or, respectively, an extension of the stator module 10 in the corresponding direction 12, 14. The boundaries of the stator sectors 110, 112, 113, 114 thus run in the first and in the second direction 12, 14 in each case in the middle of the stator assembly 100 and intersect in the center of the stator assembly 100. The stator sectors 110, 112, 113, 114 each comprise a quarter of the area, i.e. a quadrant, of the stator assembly 100.

Within the stator sectors 110, 112, 113, 114, the coil conductors 125 are located in a plurality of stator layers or stator planes arranged on top of one another, each of the stator layers comprising only coil conductors which extend in an elongated manner either substantially along the first direction 12 or substantially along the second direction 14. Apart from the extension of the coil conductors and unless differences are described in the following, the stator sectors 110, 112, 113, 114 are formed identically on the various stator layers. In the stator assembly 100 of the stator module 10 shown in FIG. 3, the stator layer on the stator surface 11 merely comprises coil conductors 125 which extend in an elongated manner along the first direction 12 and are arranged next to and adjacent to each other along the second direction 14.

The stator layer at the stator surface 11 visible in FIG. 3 forms a first stator layer of the stator assembly 100. In the vertical direction 15 below the first stator layer, the stator assembly 100 comprises at least one second stator layer.

Figure 4:
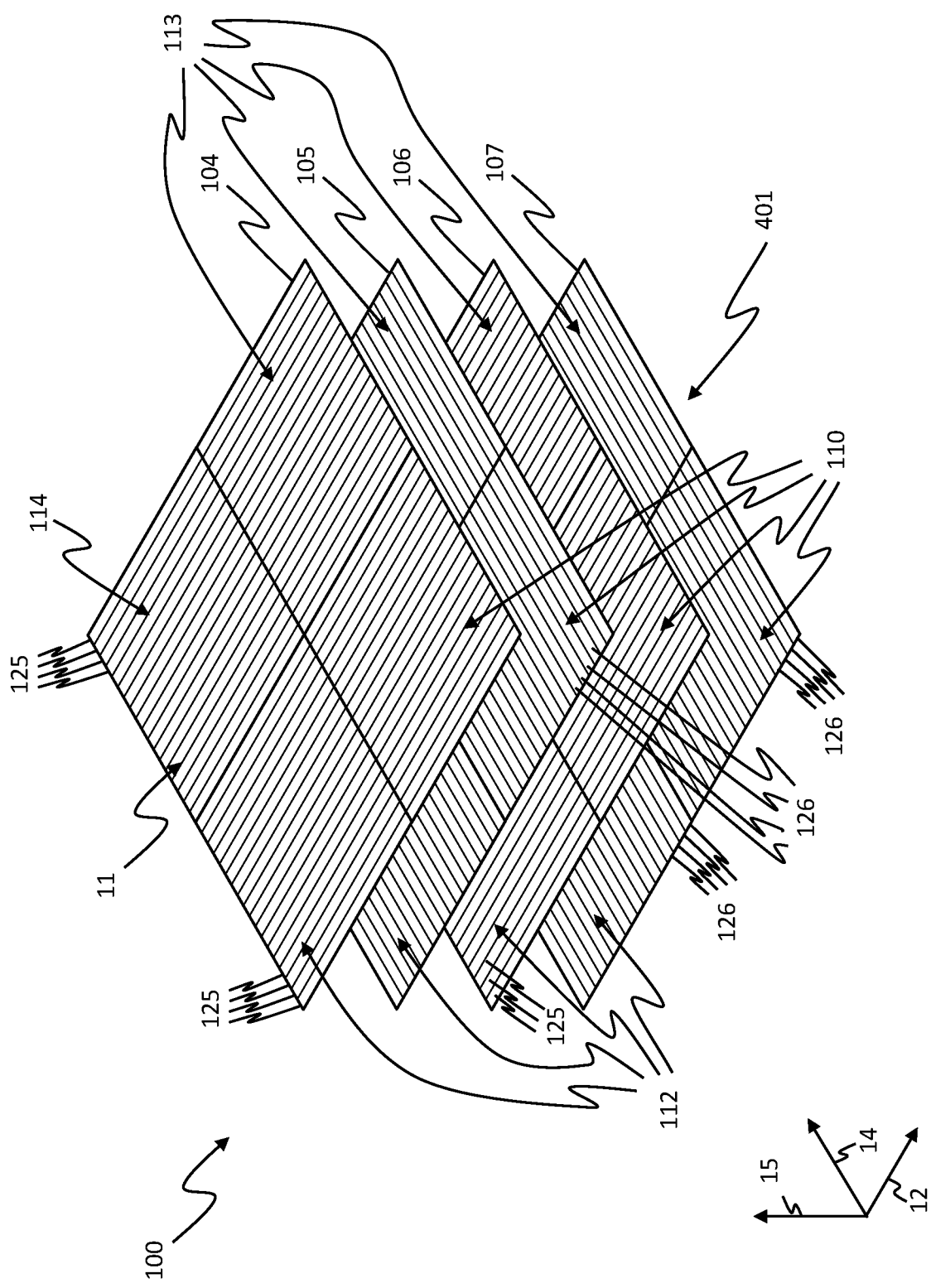
FIG. 4 is an exploded view of a stator assembly of the stator module having a first, a second, a third and a fourth stator layer.

FIG. 4 shows a schematic perspective depiction of an exploded view of the stator assembly 100 comprising the individual stator layers.

In the vertical direction 15, the stator assembly 100 comprises a second stator layer 105 under the first stator layer 104 arranged on the stator surface 11, a third stator layer 106 under the second stator layer 105 and a fourth stator layer 107 under the third stator layer 106. Unless differences are described in the following, the second, third and fourth stator layers 105, 106, 107 are embodied like the first stator layer 104 at the stator surface 11 of the stator assembly 100 shown in FIG. 3.

In the third stator layer 106 as in the first stator layer 104, the stator sectors 110, 112, 113, 114 comprise coil conductors 125 extending in an elongated manner along the first direction and 14 arranged side by side and adjoining one another in the second direction 12. In the second stator layer 105 and in the fourth stator layer 107, the stator sectors 110, 112, 113, 114 comprise further coil conductors 126. Unless differences are described in the following, the further coil conductors 126 are embodied like the coil conductors 125 in the first stator layer 104 and in the third stator layer 106. In contrast to the coil conductors 125 of the first and third stator layers 104, 106, the further coil conductors 126 of the second and fourth stator layers 105, 107 extend in an elongated manner along the second direction 14 and are arranged next to and adjoining one another in the first direction 12.

In the first and third stator layer 104, 106, the stator sectors 110, 112, 113, 114 exclusively comprise the coil conductors 125 extending in an elongated manner along the first direction 12, and not the further coil conductors 126 which extend in an elongated manner along the second direction 14, as well. Likewise, in the second and fourth stator layer 105, 107, the stator sectors 110, 112, 113, 114 exclusively comprise the further coil conductors 126 extending in an elongated manner in the second direction 14 and the coil conductors 125 extending in an elongated manner in the first direction 12, as well.

The stator sectors 110, 112, 113, 114 have the same dimensions in all stator layers 104, 105, 106, 107. In particular, the stator sectors 110, 112, 113, 114 have the same dimensions in all stator layers 104, 105, 106, 107 in the first direction 12 and in the second direction 14.

The coil conductors 125, 126 of the stator layers 104, 105, 106, 107 arranged on top of one another are each electrically insulated from each other. For example, the stator layers 104, 105, 106, 107 may each be embodied as conductor-path layers of a multi-layer printed-circuit board insulated from one another.

The stator sectors 110, 112, 113, 114 are embodied to be energized independently from each other. In particular, the coil conductors 125 and the further coil conductors 126 of the stator sectors 110, 112, 113, 114 are embodied on the stator assembly 100 in an electrically insulated manner with regard to one another. This particularly means that the coil conductors 125, 126 of the first stator sector 110 are electrically insulated from the coil conductors 125, 126 of the second stator sector 112, from the coil conductors 125, 126 of the third stator sector 113 and from the coil conductors 125, 126 of the fourth stator sector 114. Furthermore, the coil conductors 125, 126 of the second stator sector 112 are electrically insulated from the coil conductors 125, 126 of the first stator sector 110, from the coil conductors 125, 126 of the third stator sector 113 and from the coil conductors 125, 126 of the fourth stator sector 114. Furthermore, the coil conductors 125, 126 of the third stator sector 113 are electrically insulated from the coil conductors 125, 126 of the first stator sector 110, from the coil conductors 125, 126 of the second stator sector 112 and from the coil conductors 125, 126 of the fourth stator sector 114. Finally, the coil conductors 125, 126 of the fourth stator sector 114 are electrically insulated from the coil conductors 125, 126 of the first stator sector 110, from the coil conductors 125, 126 of the second stator sector 112 and from the coil conductors 125, 126 of the third stator sector 113.

While the coil conductors 125, 126 of the individual stator sectors 110, 112, 113, 114 on the stator assembly 100 are each electrically insulated from the coil conductors 125, 126 of the remaining stator sectors 110, 112, 113, 114, the coil conductors 125, 126 within the individual stator sectors 110, 112, 113, 114 may each be electrically connected to one another in a conductive manner. In particular, coil conductors 125 of the first stator layer 104 and of the third stator layer 106 which are arranged on top of one another may be electrically connected to one another within the stator sectors 110, 112, 113, 114 in a conductive manner. For example, the coil conductors 125 of the stator sectors 110, 112, 113, 114 which are arranged on top of one another may be connected in series. Likewise, further coil conductors 126 of the second stator layer 105 and of the fourth stator layer 107 which are arranged on top of one another within the stator sectors 110, 112, 113, 114 may each be electrically connected to one another in a conductive manner. For example, further coil conductors 126 of the stator sectors 110, 112, 113, 114 which are arranged on top of one another may be connected in series.

Alternative embodiments of the stator assembly 100 may comprise 15 further stator layers arranged vertically one below the other between the second and third stator layers 105, 106. In this context, the stator assembly 100 may in the vertical direction 15 respectively and alternatingly comprise in each case stator layers having coil conductors 125 essentially extending in an elongated manner along the first direction 12 and stator layers having further coil conductors 126 essentially extending in an elongated manner along the second direction 14. In addition, in alternative embodiments of the stator assembly 100 further stator layers may be arranged having coil conductors 125 extending along the first direction 125 or with further coil conductors 126 extending along the second direction 14 between the first and the second stator layer 104, 105 and/or between the third and the fourth stator layer 106, 107.

The coil conductors 125 and the further coil conductors 126 of the stator sectors 110, 112, 113, 114 are each combined within the stator layers 104, 105, 106, 107 to form stator segments.

Figure 5:
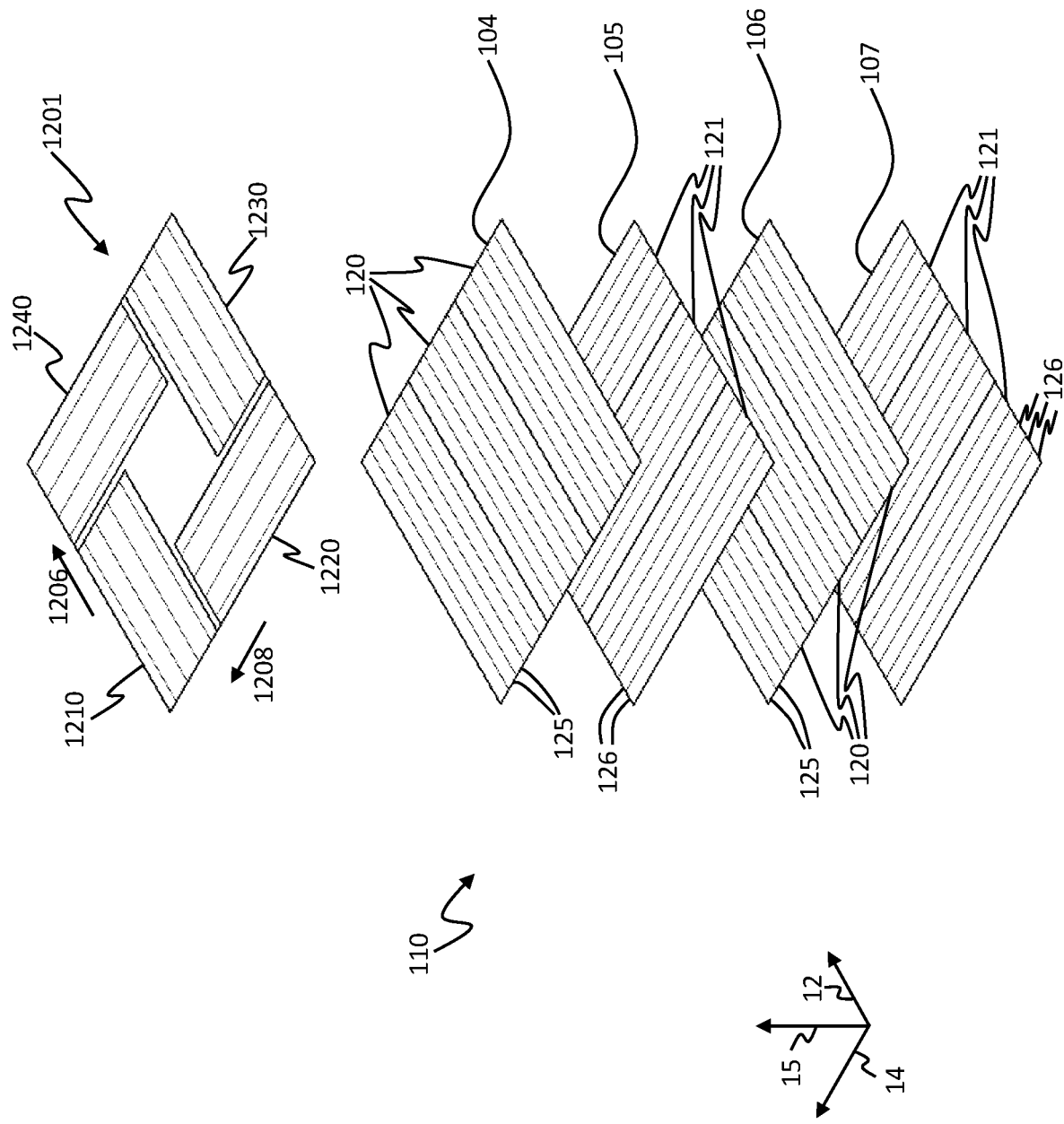
FIG. 5 shows a schematic view of the stator layers of the first stator sector with individual stator segments.

FIG. 5 shows a schematic diagram of the stator layers 104, 105, 106, 107 of the first stator sector 110 with the individual stator segments.

The coil conductors 125, 126 of the first stator sector 110 are each combined to form stator segments 120, 121 within the stator layers 104, 105, 106, 107. The first stator sector 110 comprises in each stator layer 104, 105, 106, 107 three stator segments 120, 121 arranged next to each other and adjoining each other. Each of the stator segments 120, 121 respectively comprises in each case six coil conductors 125, 126 arranged next to one another. The first stator sector 110 respectively comprises three first stator segments 120 in the first and third stator layers 104, 106 and three second stator segments 121 in the second and fourth stator layers 105, 107. The first stator segments 120 each comprise, next to one another, six of the coil conductors 125 arranged side by side along the second direction 14 and extending in an elongated manner along the first direction 12. The second stator segments 121 each comprise, next to one another, six of the further coil conductors 126 arranged side by side along the first direction 12 and extending in an elongated manner along the second direction 14.

The first stator sector 110 of the stator assembly 100 thus, in the first stator layer 104 and in the third stator layer 106, exclusively comprises coil conductors 125 extending in an elongated manner along the first direction 12, and in the second stator layer 105 and, in the fourth stator layer 107, exclusively comprises further coil conductors 126 extending in an elongated manner along the second direction 14.

The first and second stator segments 120, 121 have, apart from their orientation, identical dimensions. In particular, the dimensions of the first stator segments 120 in the first direction 12 correspond to the dimensions of the second stator segments 121 in the second direction 14 and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and third stator layers 104, 106 of the first stator sector 110 extends in the first direction 12 over the three second stator segments 121 of the second and fourth stator layers 105, 107 of the first stator sector 110 arranged side by side in the first direction 12. In addition, the second stator segments 121 of the second and fourth stator layers 105, 107 of the first stator sector 110 extend in the second direction 14 over all first stator segments 120 of the first and third stator layers 104, 106 of the first stator sector 110 arranged side by side in the second direction 14.

The arrangement of the coil conductors 125, 126 in the stator layers 104, 105, 106, 107 of the second stator sector 112, the third stator sector 113 and the fourth stator segment 114 corresponds to the arrangement of the coil conductors 125, 126 in the stator layers 104, 105, 106, 107 of the first stator sector 110 as shown in FIG. 5.

In operation of the planar-drive system 1, the rotor 1200 may be aligned above the stator assembly 100 in such a way that the first rotor direction 1206 is oriented along the first direction 12 and the second rotor direction 1208 is oriented along the second direction 14. The first magnet unit 1210 and the third magnet unit 1230 may, in operation, interact with the magnetic field generated by the coil conductors 125 of the first stator segments 120 in order to drive the rotor 1200 along the second direction 14. The second magnet unit 1220 and the fourth magnet unit 1240 may, in operation, interact with the magnetic field generated by the other coil conductors 126 of the second stator segments 121 in order to drive the rotor 1200 along the first direction 12.

Alternatively, unlike shown in FIG. 5, the rotor 1200 may be oriented in such a way that the first rotor direction 1206 is oriented along the second direction 14 and the second rotor direction 1208 is oriented along the first direction 12. In this case, the first and third magnet units 1210, 1230 interact with the magnetic field of the second stator segments 121 for driving the rotor 1200 in the first direction 12 and the second and fourth magnet units 1220, 1240 interact with the magnetic field of the first stator segments 120 for driving the rotor 1200 in the second direction 14.

The coil conductors 125, 126 of the individual stator segments 120, 121 may each be supplied with the drive currents independently from the coil conductors 125, 126 of the other stator segments 120, 121. In particular, the drive currents in one of the stator segments 120, 121 do not necessarily depend on drive currents in another of the stator segments 120, 121. In addition, the coil conductors 125, 126 of one of the stator segments 120, 121 may be supplied with drive currents, while the coil conductors 125, 126 of another, for example an adjacent stator segment 120, 121 are without current. The coil conductors 125, 126 of the individual stator segments 120, 121 are on the stator assembly 100 electrically insulated from the coil conductors 125, 126 of the other stator segments 120, 121. The coil conductors 125, 126 of different stator segments 120, 121 may e.g. be supplied with the drive currents from respective separate power modules or from separate power-generating units or, respectively, output stages of a power module of stator module 10.

The coil conductors 125, 126 in the individual stator sectors 110, 112, 113, 114 may each be connected to form multi-phase systems having a shared neutral point. The neutral point may be formed on the stator assembly 100. In particular, the coil conductors 125, 126 may be interconnected to form three-phase systems having a shared neutral point. The three-phase systems may each comprise six adjacent coil conductors 125 or six adjacent further coil conductors 126. The number of adjacent coil conductors 125, 126 in one of the three-phase systems may also amount to three, twelve or other multiples of three.

The multi-phase systems may be contacted on the stator assembly 100 in such a way that each of the multi-phase systems may be charged with a drive current independently from the other multi-phase systems. Alternatively, two or more of the multi-phase systems may be connected to each other on the stator assembly 100 in such a way that the connected multi-phase systems are each charged with a common drive current at the same time. For example, the connected multi-phase systems on the stator assembly 100 may be connected in series or in parallel.

The stator sectors 110, 112, 113, 114 may each comprise eighteen coil conductors 125, 126 in each stator layer 104, 105, 106, 107, as shown in FIGS. 3 and 4. Six adjacent coil conductors 125, 126 each may be connected to form a three-phase system and the stator sectors 110, 112, 113, 114 may each comprise three three-phase systems arranged next to each other in the first direction and three three-phase systems arranged next to each other in the second direction. In this context, coil conductors 125, 126, essentially extending in the same direction 12, 14 and arranged on top of one another in the stator layers 104, 105, 106, 107, may be connected in series to form a common three-phase system. The coil conductors 125, 126 may be connected in such a way that 15 coil conductors 125, 126 arranged on top of one another in the vertical direction are each charged with the same drive current. The three-phase systems thus have three phases, which are interconnected from coil conductors 125, 126 arranged on top of one another in the stator layers 104, 105, 106, 107.

For example, all coil conductors 125, 126 arranged on top of one another and aligned in parallel in the individual stator layers 104, 105, 106, 107 may be connected in series. In particular, the coil conductors 125 of three-phase systems lying one above the other in the first stator layer 104 and in the third stator layer 106, as well as the further coil conductors 126 of three-phase systems arranged on top of one another in the second stator layer 105 and in the fourth stator layer 107 may each be connected in series to form a combined three-phase system. In this case, all the coil conductors 125, 126 of the first and third stator layers 104, 106 and of the second and fourth stator layers 105, 107, arranged on top of one another in the vertical direction 15 and oriented in parallel may be connected in series.

In particular, in the stator assembly 100 the coil conductors 125, which extend in an elongated manner along the first direction 12, are each connected to form multi-phase systems with a common neutral point within the individual stator segments 120. The individual multi-phase systems of different stator segments 120 may be supplied with current independently from each other. Likewise, all other coil conductors 126 of the individual additional stator segments 121 are each connected to form further multi-phase systems. The individual further multi-phase systems of the further stator segments 121 may each be energized independently from each other and independently from the multi-phase systems of the stator segments 120. In particular, the coil conductors 125 of the stator segments 120 and the further coil conductors 126 of the further stator segments 121 are each connected to form three-phase systems. The coil conductors 125 and the other coil conductors 126 may each be supplied with a three-phase drive current. The drive currents comprise a first phase U, a second phase V and a third phase W, each of which has a phase offset of 120° with regard to the others.

The conductor strips 125 are spatially offset in the second direction 14 by one third of the effective wavelength of the drive magnets 1211 of the first and third magnet units 1210, 1230 interacting with the conductor strips 125. The further conductor strips 126 are spatially offset in the first direction 12 offset by one third of the effective wavelength of the other drive magnets 1221 of the second and fourth magnet units 1220, 1240 interacting with the other conductor strips 1126.

Figure 6:
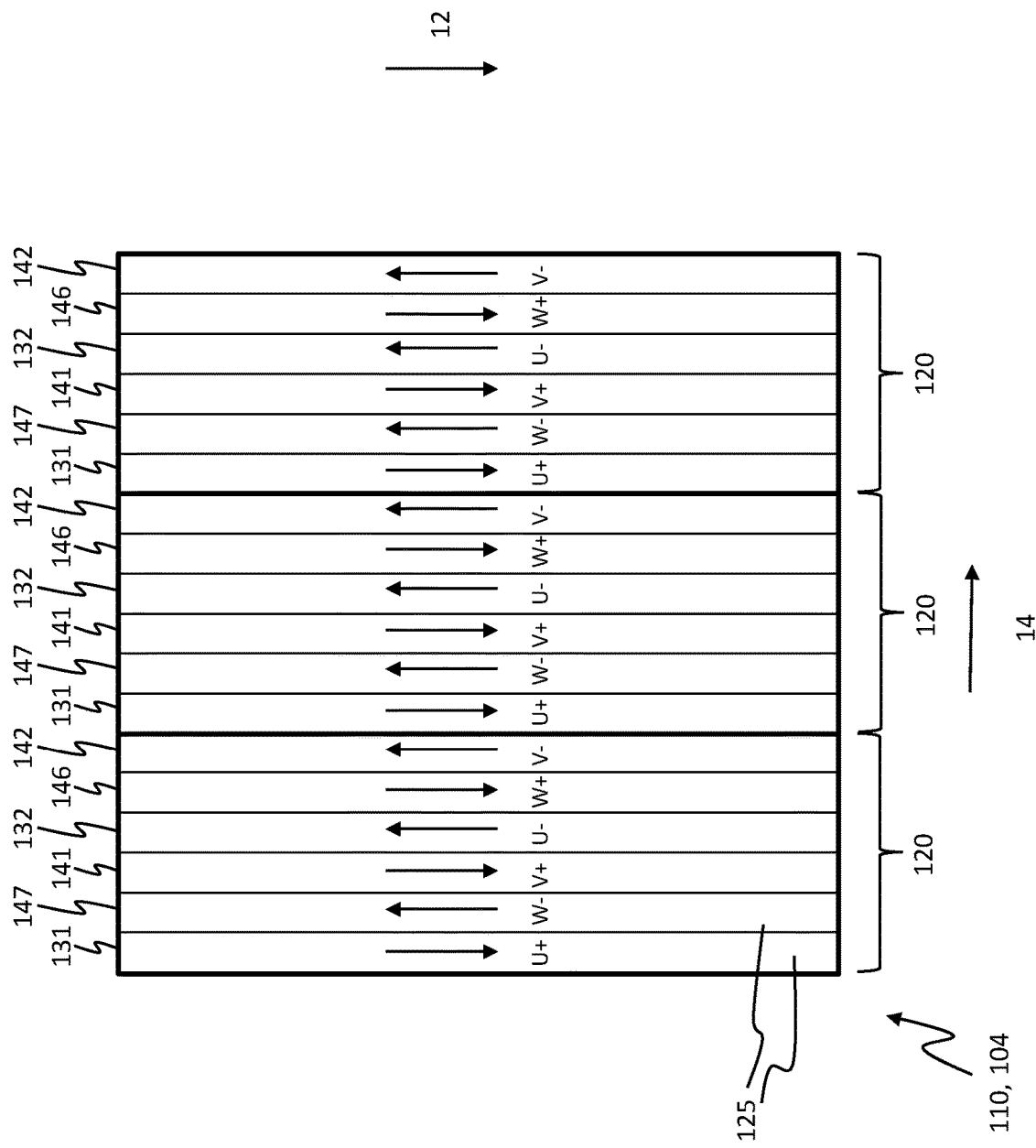
FIG. 6 is a top view onto the first stator layer of the first stator sector.
Figure 7:
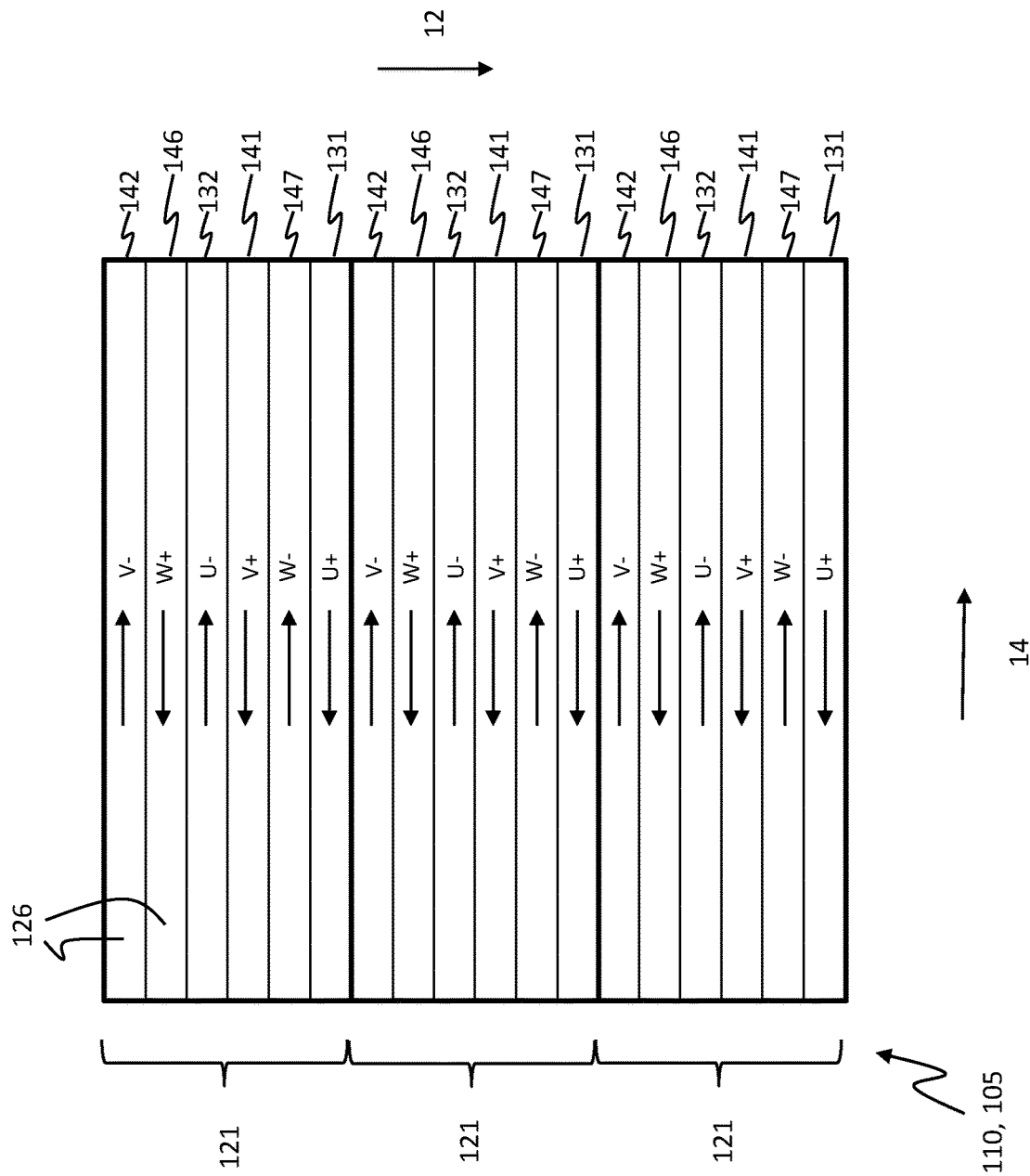
FIG. 7 is a top view of the second stator layer of the first stator sector.

FIG. 6 shows a top view onto the first stator layer 104 of the first stator sector 110. FIG. 7 shows a top view of the second stator layer 105 of the first stator sector 110. FIG. 6 and FIG. 7 show the distribution of the phases U, V, W to the coil conductors 125, 126 of the first and second stator segments 120, 121 of the first stator sector 110. The stator segments 120, 121 each have a first forward conductor 131 and a first return conductor 132 for the first phases U of the drive currents, a second forward conductor 141 and a second return conductor 142 for the second phases V of the drive currents and a third forward conductor 146 and a third return conductor 147 for the third phases W of the drive currents. As the individual stator segments 120, 121 may each be supplied with current independently from one another, the drive currents which are applied to the individual stator segments 120, 121 may vary. In particular, the individual first phases U which are applied to the different stator segments 120, 121 may vary. In addition, the individual second phases V which are applied to the different stator segments 120, 121, and the individual third phases W which are applied to the different stator segments 120, 121 may respectively vary.

The forward conductors 131, 141, 146 and the return conductors 132, 142, 147 of the individual stator segments 120, 121 are each arranged side by side along a width direction of the stator segments 120, 121. For the first stator segments 120 shown in FIG. 6, the width direction corresponds to the second direction 14. For the second stator segments 121 shown in FIG. 7, the width direction runs in parallel and opposite to the first direction 12.

The first forward conductor 131 is arranged on a first longitudinal side of the respective stator segments 120, 121. In the first stator segments 120, the first long side is oriented along the first direction 12 and in the second stator segments 121 along the second direction 14. Following the first forward conductor 131, in the stator segments 120, 121 the third return conductor 147, the second forward conductor 141, the first return conductor 132, the third forward conductor 146 and the second return conductor 142 are arranged next to and adjacent to one another in the width direction in this order.

In the stator segments 120, 121, the first phase U is conducted from a first side of the stator segments 120, 121 to a second side of the stator segments 120, 121 opposite to the first side on the first return conductor 131, and from the second side to the first side on the first return conductor 132. The second phase V is conducted from the first side of the stator segments 120, 121 to the second side of the stator segments 120, 121 on the second return conductor 141 and from the second side to the first side on the second return conductor 142. The third phase W is routed from the first side of the stator segments 120, 121 to the second side on the third forward conductor 146 of the stator segments 120, 121 and from the second side to the first side on the third return conductor 147.

The phases U, V and W are thus fed to the forward conductors 131, 141, 146 on the first side of the stator segments 120, 121 and to the return conductors 132, 142, 147 on the second side of the stator segments 120, 121. In addition, the phases U, V and W are each coupled out of the forward conductors 131, 141, 146 on the second side of the stator segments 120, 121 and out of the return conductors 132, 142, 147 on the first side of the stator segments 120, 121.

In the first stator segments 120, the first and second sides are each aligned in parallel to the second direction 14. In the second stator segments 121, the first and second sides are each aligned in parallel to the first direction 12.

The first forward and return conductor 131, 132 of first stator segments 120 arranged on top of each other on a plurality of stator layers 104, 106 may each be connected in series. In particular, the first forward conductor 131 arranged in the first stator layer 104 and the first return conductor 132 arranged in the first stator layer 104 may be connected in series with the first forward conductor 131 arranged in the third stator layer 106 and the first return conductor 132 arranged in the third stator layer 106. Analogously, the second forward and return conductor 141, 142 and the third forward and return conductor 146, 147 of first stator segments 120 arranged on top of one another in several stator layers 104, 106 may each be connected in series.

In particular, the phases U, V, W may respectively be coupled into the forward conductors 131, 141, 146 of one of the first stator segments 120 on the first or third stator layers 104, 106, then pass through all the forward and return conductors 131, 141, 146, 132, 142, 147 assigned to the relevant phase U, V, W on all stator layers 104, 106 of the relevant first stator segment 120 and finally be brought together in a neutral point. Analogous to the first stator segments 120, the first forward and return conductors 131, 132, the second forward and return conductors 141, 142 and the third forward and return conductors 146, 147 of second stator segments 121 arranged on top of one another on a plurality of stator layers 105, 107 may also be connected in series and brought together in a neutral point.

Figure 8:
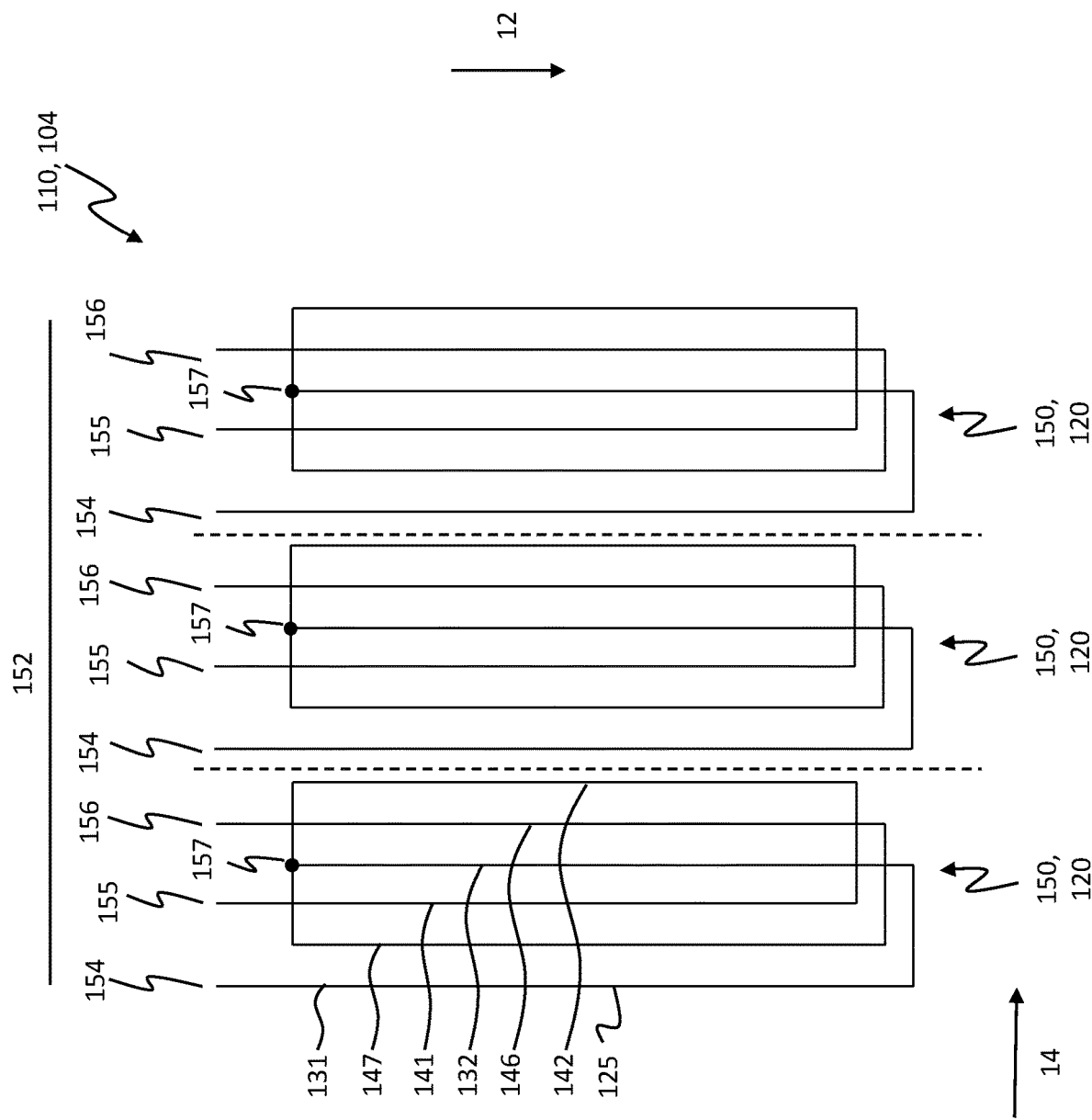
FIG. 8 depicts an equivalent circuit diagram of first stator segments of the first stator sector.

FIG. 8 shows an equivalent circuit diagram of the first stator segments 120 of the first stator sector 110. In the equivalent circuit diagram shown in FIG. 8, all the coil conductors 125 of the first stator segments 120 which are arranged on top of one another and are connected in series are shown as a single conductor. In particular, the first forward conductor 131 shown comprises all forward conductors 131 of the first stator segments 120, which are arranged on top of one another in different stator layers 104, 106 and connected in series, and the first return conductor 132 shown comprises all first return conductors 132 of the first stator segments 120, which are arranged on top of one another in different stator layers 104, 106 and are connected in series. Similarly, the shown second forward conductors 141, second return conductors 142, third forward conductors 146 and third return conductors 147 each comprise all second forward conductors 141, second return conductors 142, third forward conductors 146 and third return conductors 147 of the first stator segments 120, respectively, which are arranged on top of one another in different stator layers 104, 106 and connected in series.

The coil conductors 125 of the individual first stator segments 120 are each connected to form first three-phase systems 150. At a first side 152 of the individual first stator segments 120 oriented along the second direction 14, a first connection point 154 for feeding in the first phases U, a second connection point 155 for feeding in the second phases V and a third connection point 156 for feeding in the third phases W are arranged. The first connection point 154 is connected to a first forward conductor 131 arranged in one of the stator layers 104, 106. The second connection point 155 is connected to a second forward conductor 141 arranged in one of the stator layers 104, 106. The third connection point 156 is connected to a third forward conductor 146 arranged in one of the stator layers 104, 106. In addition, a neutral point 157 is arranged at the first side 152 of each of the first stator segments 120. In each of the neutral points 157, a first return conductor 132 of one of the stator layers 104, 106, a second return conductor 142 of one of the stator layers 104, 106 and a third return conductor 147 of one of the stator layers 104, 106 are connected to one another.

Figure 9:
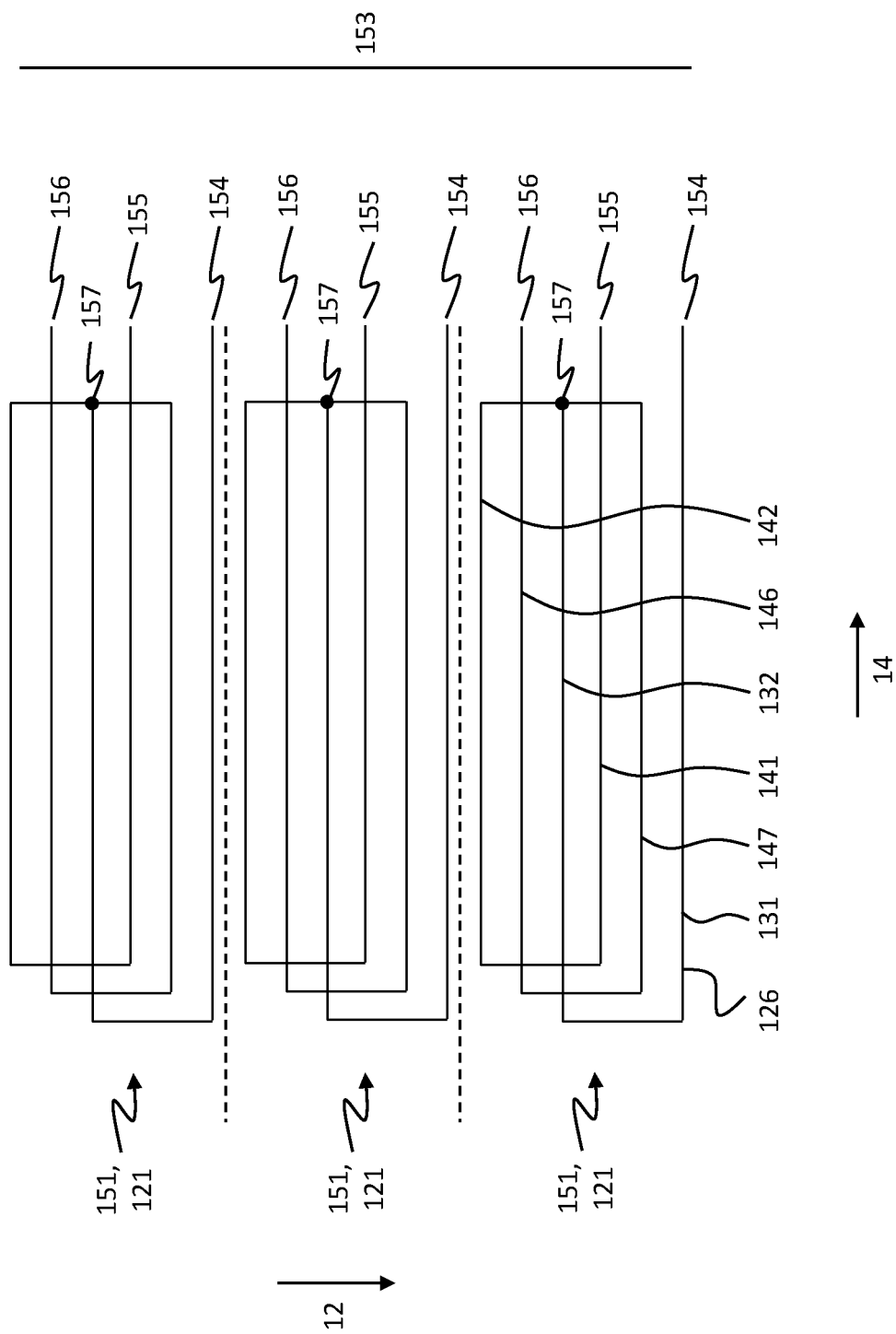
FIG. 9 shows an equivalent circuit diagram of second stator segments of the first stator sector.

FIG. 9 shows an equivalent circuit diagram of the second stator segments 121 of the first stator sector 110. In the equivalent circuit diagram shown in FIG. 9, as in the equivalent circuit diagram of the first stator segments 120 shown in FIG. 8, all further coil conductors 126 of the second stator segments 121, which are arranged on top of one another and connected in series, are shown as a single conductor.

The further coil conductors 126 of the second stator segments 121 are each connected to form second three-phase systems 151 in the same way as the coil conductors 125 of the first stator segments 120. At a first side 153 of the second stator segments 121 oriented along the first direction 12, a first connection point 154 for feeding in the first phases U, a second connection point 155 for feeding in the second phases V and a third connection point 156 for feeding in the third phases W are arranged. The first connection point 154 is connected to a first forward conductor 131 arranged in one of the stator layers 105, 107. The second connection point 155 is connected to a second forward conductor 141 arranged in one of the stator layers 105, 107. The third connection point 156 is connected to a third forward conductor 146 arranged in one of the stator layers 105, 107. In addition, a neutral point 157 is arranged on the first side 153 of each second stator segment 121. In the neutral points 157, a first return conductor 132 of one of the stator layers 105, 107, a second return conductor 142 of one of the stator layers 105, 107 and a third return conductor 147 of one of the stator layers 105, 107 are connected to each other.

Figure 10:
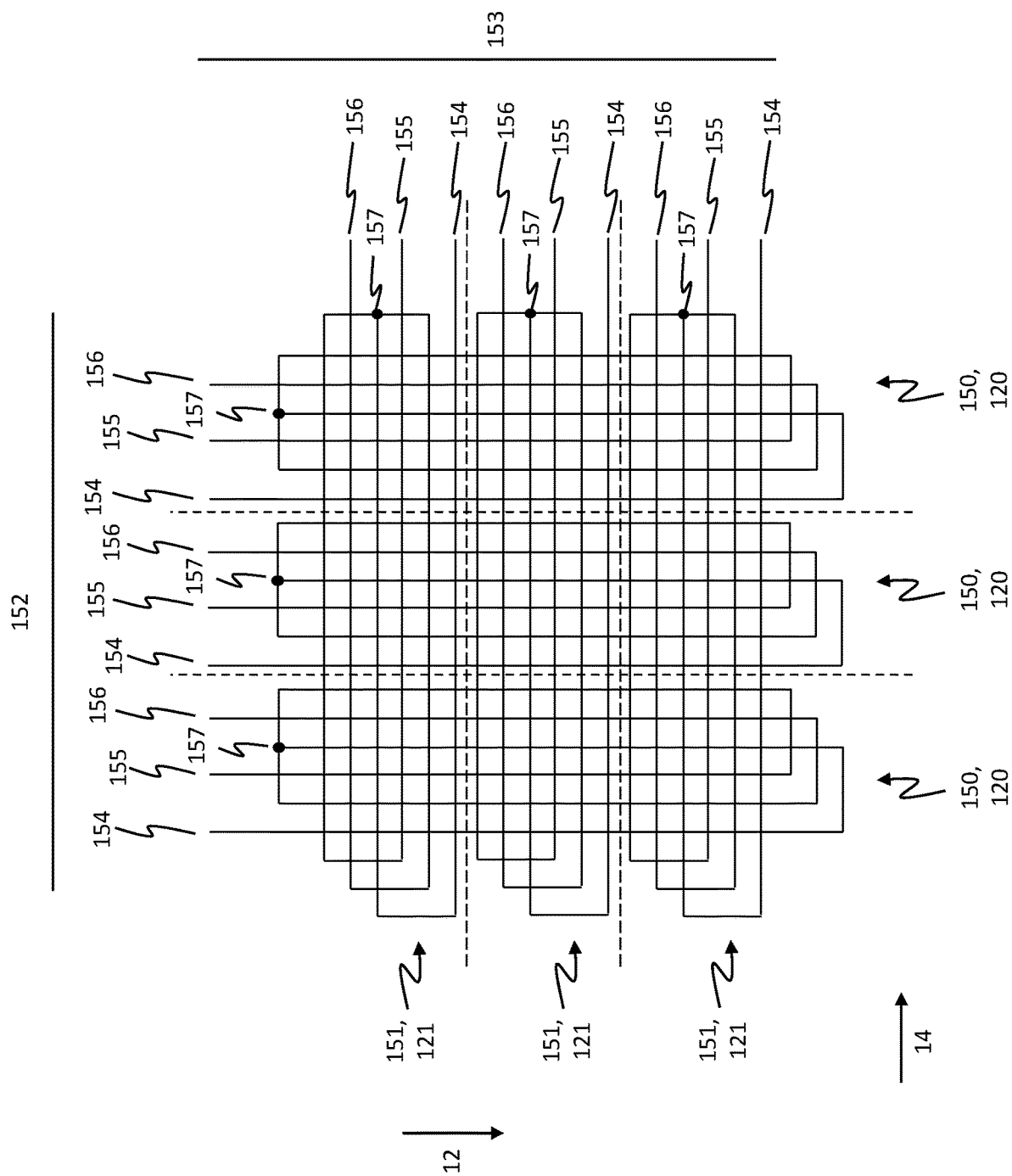
FIG. 10 shows an equivalent circuit diagram of the first and second stator segments of the first stator sector.

FIG. 10 shows an equivalent circuit diagram of the first stator sector 110 with the first three-phase systems 150 described in conjunction with FIG. 8 and representing the first stator segments 120 and the second three-phase systems 151 described in conjunction with FIG. 9 and representing the second stator segments 121. The first three-phase systems 150 and the second three-phase systems 151 are rotated by 90° relative to each other. In particular, the first side 152 of the first stator segments 120 and the first side 153 of the second stator segments 121 are arranged perpendicularly to each other.

Unless differences are described in the following, the equivalent circuit diagrams of the second stator sector 112, the third stator sector 113 and the fourth stator sector 114 respectively correspond to the equivalent circuit diagram of the first stator sector 110 shown in FIG. 10. In particular, the equivalent circuit diagram of the second stator sector 112 corresponds to the equivalent circuit diagram of the first stator sector 110 mirrored at the first side 152 of the first stator segments 120, the equivalent circuit diagram of the third stator sector 113 corresponds to the equivalent circuit diagram of the first stator sector 110 mirrored at the first side 153 of the second stator segments 121, and the equivalent circuit diagram of the fourth stator sector 114 corresponds to the equivalent circuit diagram of the first stator sector 110 rotated by 180°.

Figure 11:
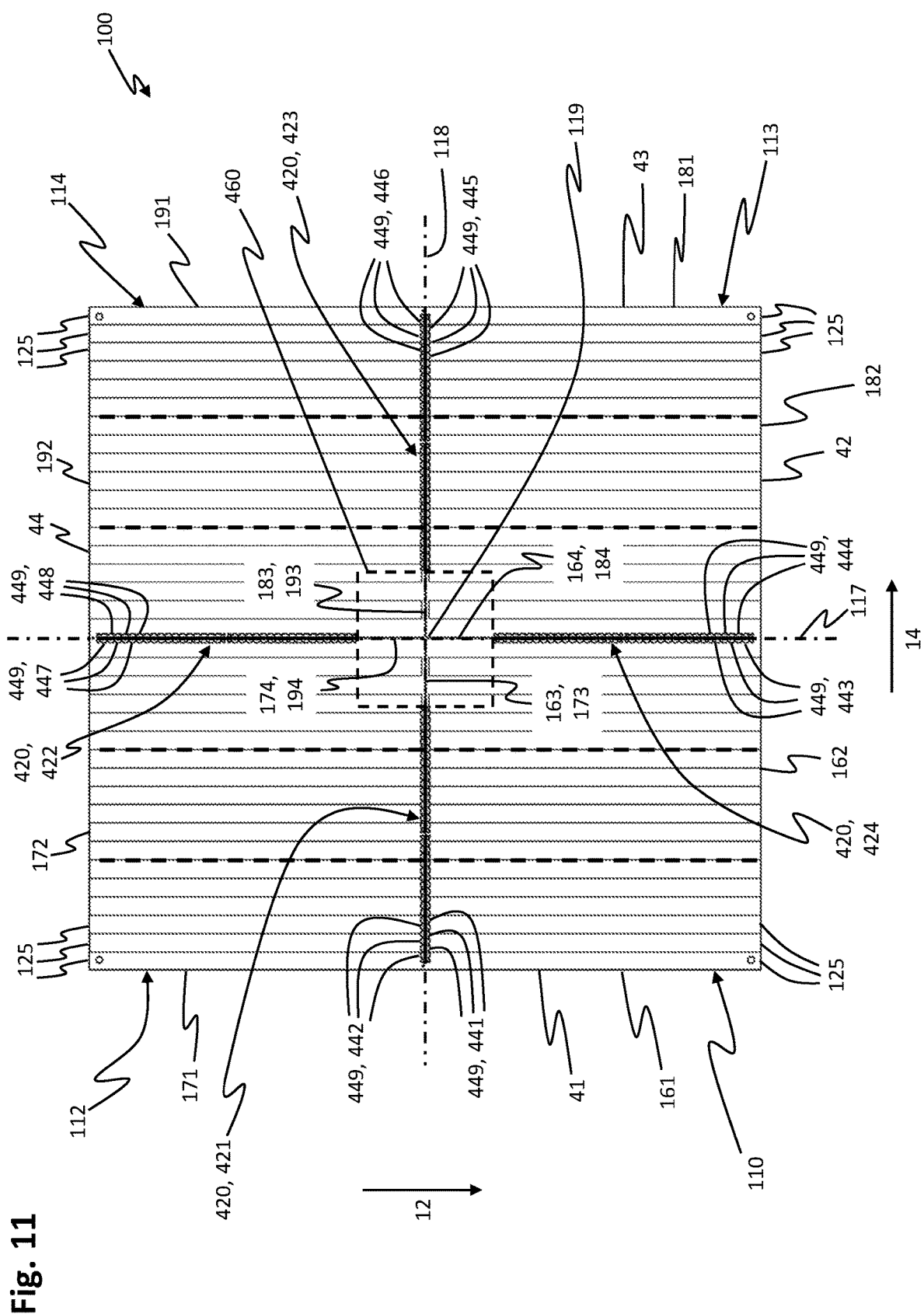
FIG. 11 is a top view onto the stator assembly of the stator module.

FIG. 11 shows a top view onto the stator module 10 comprising the stator assembly 100 and the stator sectors 110, 112, 113, 114. The first stator sector 110 comprises a first outer edge 161 oriented along the first direction 12 and a second outer edge 162 oriented along the second direction 14. The second stator sector 112 has a first outer edge 171 oriented along the first direction 12 and a second outer edge 172 oriented along the second direction 14. The third stator sector 113 has a first outer edge 181 oriented along the first direction 12 and a second outer edge 182 oriented along the second direction 14. The fourth stator sector 114 has a first outer edge 191 oriented along the first direction 12 and a second outer edge 192 oriented along the second direction 14.

The first stator sector 110 comprises a first inner edge 163 oriented along the second direction 14 and arranged opposite to the second outer edge 162 of the first stator sector 110, and a second inner edge 164 oriented along the first direction 12 and arranged opposite to the first outer edge 161 of the first stator sector 110. The second stator sector 112 comprises a first inner edge 173 oriented along the second direction 14, which is arranged opposite to the second outer edge 172 of the second stator sector 112, and a second inner edge 174 oriented along the first direction 12, which is arranged opposite to the first outer edge 171 of the second stator sector 112.

The third stator sector 113 comprises a first inner edge 183 oriented along the second direction 14, and arranged opposite to the second outer edge 182 of the third stator sector 113, and a second inner edge 184 oriented along the first direction 12, which is arranged opposite to the first outer edge 181 of the third stator sector 113. The fourth stator sector 114 comprises a first inner edge 193 oriented along the second direction 14 and arranged opposite to the second outer edge 192 of the fourth stator sector 114, and a second inner edge 194 oriented along the first direction 12 and arranged opposite to the first outer edge 191 of the fourth stator sector 114.

The stator sectors 110, 112, 113, 114 are flush with the stator module 10 and the stator surface 11 at the outer sides. In particular, the first outer edge 161 of the first stator sector 110 oriented along the first direction 12, and the first outer edge 171 of the second stator sector 112 oriented along the first direction 12 are flush with a first outer edge 41 of the stator surface 11 oriented along the first direction 12. The second outer edge 162 of the first stator sector 110 oriented along the second direction 14, and the second outer edge 182 of the third stator sector 113 oriented along the second direction 14, are flush with a second outer edge 42 of the stator surface 11 oriented along the second direction 14. The first outer edge 181 of the third stator sector 113 oriented along the first direction 12, and the first outer edge 191 of the fourth stator sector 114, oriented along the first direction 12, are flush with a third outer edge 43 of the stator surface 11 oriented along the first direction 12 and opposite to the first outer edge 41 of the stator surface 11. The second outer edge 172 of the second stator sector 112, oriented along the second direction 14, and the second outer edge 192 of the fourth stator sector 114 oriented along the second direction 14, are flush with a fourth outer edge 44 of the stator surface 11 oriented along the second direction 14 and opposite to the second outer edge 42 of the stator surface 11.

Inside of the stator assembly 100, the stator sectors 110, 112, 113, 114 are arranged adjacent to each other. The first inner edge 163 of the first stator sector 110 oriented along the second direction 14 is arranged at the first inner edge 173 of the second stator sector 112 oriented along the second direction 14. The second inner edge 174 oriented along the first direction 12 of the second stator sector 112 is arranged at the second inner edge 194 oriented along the first direction 12 of the fourth stator sector 114. The first inner edge 183 of the third stator sector 113 oriented along the second direction 14 is arranged at the first inner edge 193 of the fourth stator sector 114 oriented along the second direction 14. The second inner edge 184 of the third stator sector 113 oriented along the first direction 12 is arranged at the second inner edge 164 of the first stator sector 110 oriented along the first direction 12.

In the stator module 10, the second inner edges 164, 174, 184, 194 of the stator sectors 110, 112, 113, 114 are each located on a first line oriented along the first direction 12 and the first inner edges 163, 173, 183, 193 are located on a second line oriented along the second direction 14. The first inner edges 163, 173 of the first and second stator sectors 110, 112 are flush with the first inner edges 183, 193 of the third and fourth stator sectors 113, 114 on the second line. The second inner edges 164, 184 of the first and third stator sectors 110, 113 are aligned with the second inner edges 174, 194 of the second and fourth stator sectors 112, 114 on the first line.

The first line is perpendicular to the second line. The first line is in the second direction 14 arranged in the middle of the stator module 10 and the stator assembly 100 between the first stator sector 110 and the third stator sector 113, and between the second stator sector 112 and the fourth stator sector 114. In particular, the first line is located in the middle between the first and third outer edges 41, 43 of the stator surface 11, the stator assembly 100 and the stator module 10. The first line forms a first central line 117 of the stator surface 11, the stator assembly 100 and the stator module 10 oriented along the first direction 12. The second line is arranged in the first direction 12 in the center of the stator module 10 and the stator assembly 100 between the first stator sector 110 and the second stator sector 112, as well as between the third stator sector 113 and the fourth stator sector 114. In particular, the second line is arranged in the middle between the second and fourth outer edge 42, 44 of the stator surface 11, of the stator assembly 100 and of the stator module 10. The second line forms a second central line 118 of the stator surface 11, the stator assembly 100 and the stator module 10 oriented along the second direction 14.

The second central line 118 may in general also be referred to as the central line of the stator assembly 100 and the first central line 117 may in general also be referred to as the further central line of the stator assembly 100.

The stator assembly 100 comprises a first contact structure 421, a second contact structure 422, a third contact structure 423 and a fourth contact structure 424.

The first contact structure 421 may generally also be described as a contact structure of the stator assembly 100. The fourth contact structure 424 may in general also be referred to as further contact structure of the stator assembly 100. The third contact structure 423 may in general also be referred to as additional contact structure of the stator assembly 100. The second contact structure 422 may in general also be referred to as further additional contact structure of the stator assembly 100.

The first contact structure 421 is arranged at an inner edge of the first stator sector 110 formed by the first inner edge 163 of the first stator sector 110 and at an inner edge of the second stator sector 112 formed by the first inner edge 173 of the second stator sector 112. The fourth contact structure 424 is arranged at a further inner edge of the first stator sector 110 formed by the second inner edge 164 of the first stator sector 110 and at an inner edge of the third stator sector 113 formed by the second inner edge 184 of the third stator sector 113. The third contact structure 423 is arranged at a further inner edge of the third stator sector 113 formed by the first inner edge 183 of the third stator sector 113 and at an inner edge of the fourth stator sector 114 formed by the first inner edge 193 of the fourth stator sector 114. The second contact structure 422 is arranged at a further inner edge of the second stator sector 112 formed by the second inner edge 174 of the second stator sector 112 and at a further inner edge of the fourth stator sector 114 formed by the second inner edge 194 of the fourth stator sector 114.

The first contact structure 421, the second contact structure 422, the third contact structure 423 and the fourth contact structure 424 each comprise several contact units 449. The contact units 449 are electrically connected to the coil conductors 125, 126 of the stator assembly 100 in a conductive manner and are embodied to feed the drive currents into the coil conductors 125, 126. If the coil conductors 125, 126 of the stator sectors 110, 112, 113, 114 are each connected to three-phase systems, the contact units 449 are particularly embodied to feed the drive currents into the multi-phase systems of the stator segments 120, 121. The stator assembly 100 then comprises at least one, in particular two, contact units 449 for each connection point 154, 155, 156 of the three-phase systems.

The first contact structure 421 comprises a first contact-unit group 441 and a second contact-unit group 442. The first contact-unit group 441 is electrically conductively connected to the coil conductors 125 of the first stator sector 110, which extend in an elongated manner in the first direction 12, and comprises all contact units 449 which are electrically conductively connected to the coil conductors 125 of the first stator sector 110, which extend in an elongated manner in the first direction 12. The second contact-unit group 442 is electrically conductively connected to the coil conductors 125 of the second stator sector 112, which extend in an elongated manner along the first direction 12, and comprises all contact units 449 which are electrically conductively connected to the coil conductors 125 of the second stator sector 112, which extend in an elongated manner along the first direction 12. In particular, the first contact structure 421 comprises all contact units 449 which are electrically conductively connected to the coil conductors 125 which are arranged in the first and second stator sectors 110, 112 in the first and third stator layers 104, 106.

The fourth contact structure 424 comprises a third contact-unit group 443 and a fourth contact-unit group 444. The third contact-unit group 443 is electrically conductively connected to the further coil conductors 126 of the first stator sector 110 which extend in an elongated manner along the second direction 14 and comprises all contact units 449 which are electrically conductively connected to the further coil conductors 126 of the first stator sector 110 which extend in an elongated manner along the second direction 14. The fourth contact-unit group 444 is electrically conductively connected to the further coil conductors 126 of the third stator sector 113, which are elongated along the second direction 14 and comprises all contact units 449 which are electrically conductively connected to the further coil conductors 126 of the third stator sector 113, which extend in an elongated manner along the second direction 14. In particular, the fourth contact structure 424 comprises all contact units 449 which are electrically conductively connected to the further coil conductors 126 which are arranged in the first and third stator sectors 110, 113 in the second and fourth stator layers 105, 107.

The third contact structure 423 comprises a fifth contact-unit group 445 and a sixth contact-unit group 446. The fifth contact-unit group 445 is electrically conductively connected to the coil conductors 125 of the third stator sector 113 extending in an elongated manner along the first direction 12 and comprises all contact units 449 which are electrically conductively connected to the coil conductors 125 of the third stator sector 113 extending in an elongated manner along the first direction 12. The sixth contact-unit group 446 is electrically conductively connected to the coil conductors 125 of the fourth stator sector 114, which extend longitudinally along the first direction 12, and comprises all contact units 449, which are electrically conductively connected to the coil conductors 125 of the fourth stator sector 114, extending in an elongated manner along the first direction 12. In particular, the third contact structure 423 comprises all contact units 449 which are electrically conductively connected to coil conductors 125 which are arranged in the third and fourth stator sectors 113, 114 in the first and third stator layers 104, 106.

The second contact structure 422 comprises a seventh contact-unit group 447 and an eighth contact-unit group 448. The seventh contact-unit group 447 is electrically conductively connected to the further coil conductors 126 of the second stator sector 112 extending in an elongated manner along the second direction 14 and comprises all contact units 449 which are electrically conductively connected to the further coil conductors 126 of the second stator sector 112 extending in an elongated manner along the second direction 14. The eighth contact-unit group 448 is electrically conductively connected to the further coil conductors 126 of the fourth stator sector 114 extending in an elongated manner in the second direction 14, and comprises all contact units 449, which are electrically conductively connected to the further coil conductors 126 of the fourth stator sector 114 extending in an elongated manner in the second direction 14. In particular, the second contact structure 422 comprises all contact units 449 which are electrically conductively connected to the further coil conductors 126 which are arranged in the second and fourth stator sectors 112, 114 in the second and fourth stator layers 105, 107.

As a result, the contact units 449 of all further coil conductors 126 extending in an elongated manner along the second direction 14 are arranged at the first line oriented along the first direction 12, in particular on the first central line 117. The contact units 449 of all coil conductors 125 extending in an elongated manner along the first direction 12 are arranged on the second line oriented along the second direction 14, in particular at the second central line 118.

If the coil conductors 125, 126 of the first stator sector 110 are connected together to form three-phase systems according to FIG. 10, a comparison of the depictions of the first stator sector 110 in FIG. 11 and FIG. 10 shows that the connection points 154, 155, 156 of the first stator segments 120 of the first stator sector 110 arranged along the first side 152 of the first stator segments 120 are arranged at the first inner edge 163 of the first stator sector 110. In addition, the connection points 154, 155, 156 of the second stator segments 121 of the first stator sector 110 arranged along the first side 153 of the second stator segments 121 are arranged at the second inner edge 164 of the first stator sector 110. The neutral points 157 of the first stator segments 120 of the first stator sector 110 are arranged at the first inner edge 163 of the first stator sector 110 and the neutral points 157 of the second stator segments 121 of the first stator sector 110 are arranged at the second inner edge 164 of the first stator sector 110.

If the coil conductors 125, 126 of the second stator sector 112 are connected to form three-phase systems in analogy to the first stator sector 110, the equivalent circuit diagram of the second stator sector 112 is mirrored at the first side 152 of the first stator segments 120 with respect to the equivalent circuit diagram of the first stator sector 110 shown in FIG. 10. The first side 152 of the first stator segments 120 of the second stator sector 112 is then arranged along the first inner edge 173 of the second stator sector 112. In addition, the first side 153 of the second stator segments 121 of the second stator sector 112 is then arranged along the second inner edge 174 of the second stator sector 112. The neutral points 157 of the first stator segments 120 of the second stator sector 112 are arranged at the first inner edge 173 of the second stator sector 112 and the neutral points 157 of the second stator segments 121 of the second stator sector 112 are arranged at the second inner edge 174 of the second stator sector 112.

If the coil conductors 125, 126 of the third stator sector 113 are connected to form three-phase systems in analogy to the first stator sector 110, the equivalent circuit diagram of the third stator sector 113 is mirrored at the first side 153 of the second stator segments 121 with respect to the equivalent circuit diagram of the first stator sector 110 shown in FIG. 10. The first side 152 of the first stator segments 120 of the third stator sector 213 is arranged along the first inner edge 183 of the third stator sector 113. In addition, the first side 153 of the second stator segments 121 of the third stator sector 113 is arranged along the second inner edge 184 of the third stator sector 113. The neutral points 157 of the first stator segments 120 of the third stator sector 113 are arranged at the first inner edge 183 of the third stator sector 113 and the neutral points 157 of the second stator segments 121 of the third stator sector 113 are arranged at the second inner edge 184 of the third stator sector 113.

If the coil conductors 125, 126 of the fourth stator sector 114 are connected to form three-phase systems in analogy to the first stator sector 110, the equivalent circuit diagram of the fourth stator sector 114 is rotated by 180° with respect to the equivalent circuit diagram of the first stator sector 110 shown in FIG. 10. The first side 152 of the first stator segments 120 of the fourth stator sector 114 is arranged along the first inner edge 193 of the fourth stator sector 114. Furthermore, the first side 153 of the second stator segments 121 of the fourth stator sector 114 is arranged along the second inner edge 194 of the fourth stator sector 114. The neutral points 157 of the first stator segments 120 of the fourth stator sector 114 are located at the first inner edge 193 of the fourth stator sector 114 and the neutral points 157 of the second stator segments 121 of the fourth stator sector 114 are located at the second inner edge 194 of the fourth stator sector 114.

In total, the connection points 154, 155, 156 of the first stator segments 120 of the first, second, third and fourth stator sectors 110, 112, 113, 114 are thus located on the second central line 118. The connection points 154, 155, 156 of the second stator segments 121 of the first, second, third and fourth stator sectors 110, 112, 113, 114 are all located on the first central line 117. When interconnecting the coil conductors 125, 126 to form three-phase systems having a shared neutral point, the three free connections of the individual phases may each be electrically conductively connected to at least one of the, in particular to two, contact units 449 of the contact-unit groups 441, 442, 443, 444, 445, 446, 447, 448. If the stator sectors 110, 112, 113, 114 each comprise three three-phase systems arranged side by side in the second direction 14, each with six coil conductors 125, and three three-phase systems arranged side by side in the first direction 12, each with six further coil conductors 126, the stator sectors 110, 112, 113, 114 each have eighteen connections, each of which may be connected to at least eighteen, in particular thirty-six, contact units 449 of contact structures 421, 422, 423, 444. The first, second, third and fourth contact structures 421, 422, 423, 424 then each comprise at least eighteen, in particular thirty-six, contact units 449.

Instead of interconnecting the coil conductors 125, 126 of the individual stator sectors 110, 112, 113, 114 to form multi-phase systems, in alternative embodiments of the stator assembly 100, the coil conductors 125, 126 or coil conductors 125, 126 of several stator levels 104, 105, 106, 107 arranged on top of one another and each connected in series may also be connected separately to their own connection points or contact units 449. In particular, each of the coil conductors 125, 126 may be connected individually and independently from all other coil conductors 125, 126 to one or two of the contact units 449 and may be supplied with an electric drive current via the respective contact unit 449 or the respective contact units 449.

In the stator assembly 100, no contact units 449 are respectively arranged at the outer edges 41, 42, 43, 44 of the stator assembly 100, at the outer edges 161, 162 of the first stator sector 110, at the outer edges 171, 172 of the second stator sector 112, at the outer edges 181, 182 of the third stator sector 113 and at the outer edges 191, 192 of the fourth stator sector 114. The outer edges 41, 42, 43, 44 of the stator assembly 100, the outer edges 161, 162 of the first stator sector 110, the outer edges 171, 172 of the second stator sector 112, the outer edges 181, 182 of the third stator sector 113 and the outer edges 191, 192 of the fourth stator sector 114 are thus all free of contact units 449. Therefore, outer areas of the stator assembly 100 are arranged along the outer edges 161, 162, 171, 172, 181, 182, 191, 192 of the stator sectors 110, 112, 113, 114, which are embodied without contact units 449.

The contact units 449 are arranged exclusively on the inner edges 163, 164, 173, 174, 183, 184, 193, 194 of the stator sectors 110, 112, 113, 114. In particular, the outer edges 41, 42, 43, 44 of the stator assembly 100, the outer edges 161, 162 of the first stator sector 110, the outer edges 171, 172 of the second stator sector 112, the outer edges 181, 182 of the third stator sector 113 and the outer edges 191, 192 of the fourth stator sector 114 are all free of connection points 154, 155, 156 of the stator segments 120, 121.

The first contact-unit group 441 and the second contact-unit group 442 of the first contact structure 421 may be arranged in a row along the second direction 14 as shown in FIG. 11. In particular, the contact units 449 of the first contact-unit group 441 and the contact units 449 of the second contact-unit group 442 may be arranged in a row along the second direction 14. Thereby, a contact unit 449 of the first contact-unit group 441 may each be alternatingly arranged next to a contact unit 449 of the second contact-unit group 442 or two contact units 449 of the first contact-unit group 441 may each be alternatingly arranged next to two contact units 449 of the second contact-unit group 442.

In addition, as shown in FIG. 11, the fifth contact-unit group 445 and the sixth contact-unit group 446, in particular the contact units 449 of the fifth contact-unit group 445 and the contact units 449 of the sixth contact-unit group 446, may be arranged in a row next to one another along the second direction 14. Thereby, one contact unit 449 of the fifth contact-unit group 445 each be alternatingly arranged next to a contact unit 449 of the sixth contact-unit group 446 or two contact units 449 of the fifth contact-unit group 445 may each be alternatingly arranged next to two contact units 449 of the sixth contact-unit group 446.

Similarly, as shown in FIG. 11, the third contact-unit group 443 and the fourth contact-unit group 446, in particular the contact units 449 of the third contact-unit group 443 and the contact units 449 of the fourth contact-unit group 444, may be arranged in a row next to one another along the first direction 12. Thereby, one contact unit 449 of the third contact-unit group 443 each be alternatingly arranged next to a contact unit 449 of the fourth contact-unit group 444 or two contact units 449 of the third contact-unit group 443 each be alternatingly arranged next to two contact units 449 of the fourth contact-unit group 444.

In addition, as shown in FIG. 11, the seventh contact-unit group 447 and the eighth contact-unit group 448, in particular the contact units 449 of the seventh contact-unit group 447 and the contact units 449 of the eighth contact-unit group 448, may be arranged in a row along the first direction 12. Thereby, one contact unit 449 of the seventh contact-unit group 447 each be alternatingly arranged next to a contact unit 449 of the eighth contact-unit group 448 or two contact units 449 of the seventh contact-unit group 447 each be alternatingly arranged next to two contact units 449 of the eighth contact-unit group 448.

The stator assembly 100 has a center area 460 in the center of the stator assembly 100 at a crossing point 119 of the first and second central lines 117, 118. The first contact-unit group 441, the second contact-unit group 442, the third contact-unit group 443, the fourth contact-unit group 444, the fifth contact-unit group 445, the sixth contact-unit group 446, the seventh contact-unit group 447 and the eighth contact-unit group 448 are located outside of the center region 460. In particular, the contact units 449 of contact-unit groups 441, 442, 443, 444, 445, 446, 447, 448 are arranged outside of the center area 460.

The first contact structure 421, the second contact structure 422, the third contact structure 423 and the fourth contact structure 424 form a cross-shaped contact arrangement 420 of the stator assembly 100 for contacting the coil conductors 125, 126 of the stator assembly 100. The contact arrangement 420 is cross-shaped and is aligned along the first central line 117 and the second central line 118 of the stator module 10 and the stator assembly 100. The contact structure 420 is thus located on the boundaries of the stator sectors 110, 112, 113, 114 in the first and second directions 12, 14 inside of the stator assembly 100 and of the stator module 10, in particular the connection points 154, 155, 156 of the first and second stator segments 120, 121, arranged on the first central line 117 and on the second central line 118 form the contact structure 420 for contacting the stator segments 120, 121.

The stator assembly 100 may be embodied as a multi-layer unit, the stator layers 104, 105, 106, 107 with the coil conductors 125, 126 each being connected to one another via insulating intermediate layers. For example, the stator assembly 100 may be embodied as a printed-circuit board. In particular, the stator assembly 100 may be embodied as a multi-layer printed-circuit board, wherein the stator layers 104, 105, 106, 107 are each arranged in different layers of the printed-circuit board. The coil conductors 125, 126 may have a thickness between 10 μm and 500 μm on the layers of the printed-circuit board, in particular the coil conductors 125, 126 may have a thickness between 50 μm and 250 μm. The contact units 449 may each be embodied as contact holes or vias (vertical interconnect access) in the stator assembly 100 and comprise conductively coated through-holes through the stator assembly 100.

In order to be able to interconnect the forward and return conductors 131, 141, 146, 132, 142, 147 of the three-phase systems 150, 151 of the stator segments 120, 121 according to the equivalent circuit diagrams shown in FIGS. 8, 9 and 10, the stator assembly 100 may each comprise connecting structures. The connecting structures may be located on the coil conductors 125, 126 or between the coil conductors 125, 126 of the stator assembly 100.

A part of the connecting structures may be embodied as horizontal connecting structures which connect coil conductors 125, 126 arranged in the individual stator segments 120, 121 within the same stator layer 104, 105, 106, 107. The horizontal connecting structures are arranged on the same stator layer 104, 105, 106, 107 as the coil conductors 125, 126 to be connected. The horizontal connecting structures in the stator layers 104, 105, 106, 107 may each extend in the direction 12, 14 in which the coil conductors 125, 126 are arranged next to one another. In the stator layers 104, 106, in which the coil conductors 125 extend along the first direction 12 and arranged side by side along the second direction 14, the horizontal connecting structures may run along the second direction 14. In the stator layers 105, 107, in which the further coil conductors 126 extend in an elongated manner along the second direction 14, the horizontal connecting structures may run along the first direction 12. Like the coil conductors 125, 126, the horizontal connecting structures may be embodied as conductor path or conductor-path sections of a layer of a printed-circuit board of the stator assembly 100.

A part of the connecting structures may be embodied as vertical connecting structures which connect coil conductors 125, 126 which are arranged in the individual stator segments 120, 121 in different stator layers 104, 105, 106, 107. Via the vertical connecting structures, the first forward and return conductors 131, 132 for the first phases U of the drive currents may e.g. be connected in series. Likewise, the second forward and return conductors 141, 142 for the second phases V of the drive currents and the third forward and return conductors 146, 147 for the third phases W of the drive currents may be connected in series via the vertical connecting structures. The vertical connecting structures may be embodied as through-holes or vias (vertical interconnect access), i.e. contact holes, between the individual stator layers 104, 105, 106, 107 of the printed-circuit board of the stator assembly 100.

The schematic diagrams of the preceding figures show the coil conductors 125, 126 each as rectangularly formed conductor structures extending over the entire stator sectors 110, 112, 113, 114. The coil conductors 125, 126 may be embodied in areas of the stator assembly 100 remote from the connecting structures, as shown schematically in the preceding figures. However, particularly in the area of the connecting structures, the shape of the coil conductors 125, 126 may differ from the schematic depictions in the preceding figures. In particular, the coil conductors 125 of the first stage segments 120 may in the area of the connecting structures be narrower in the second direction 14 than in the areas remote from the connecting structures. Likewise, the other coil conductors 126 of the second stator segments 121 may in the area of the connecting structures be narrower in the first direction 12 than in the areas remote from the connecting structures.

The coil conductors 125 of the first stator segments 120 may also be shorter in the first direction 12 than shown schematically in the preceding figures. The further coil conductors 126 of the second stator segments 121 may also be shorter in the second direction 14 than shown in the preceding figures. In particular, the coil conductors 125 of the individual first stator segments 120 do not have to completely extend over the first stator segments 120 in the first direction 12 and the further coil conductors 126 of the individual second stator segments 121 do not have to completely extend over the second stator segments 121 in the second direction 14. Instead, horizontal connecting structures and/or vertical connecting structures may be arranged in the area of the outer edges 161, 162, 171, 172, 181, 182, 191, 192 and of the inner edges 163, 164, 173, 174, 183, 184, 193, 194 of the stator sectors 110, 112, 113, 114.

An electrically conductive connection between the contact units 449 of the contact arrangement 420 and the coil conductors 125, 126 may be established in any desired stator layer 104, 105, 106, 107 of the stator assembly 100. In particular, an electrically conductive connection between one of the contact units 449 and one of the coil conductors 125, 126 may exist in the stator layers 105, 106 which are arranged in the vertical direction 15 inside of the stator assembly 100. The stator layers 105, 106 arranged inside of the stator assembly 100 form inner layers of the stator assembly 100, whereas the stator layers 104, 107 arranged on the stator surface 11 and on a bottom surface of the stator assembly 100 opposite to the stator surface 11 form outer layers of the stator assembly 100. The inner layers are thus arranged between the outer layers. In the stator assembly 100 shown in FIG. 4, the first stator layer 104 and the fourth stator layer 107 each form outer layers and the second stator layer 105 and the third stator layer 106 each form inner layers of the stator assembly 100. Stator layers 104, 105, 106, 107 having one coil conductor 125, 126 or a plurality of coil conductors 125, 126, which are electrically conductively connected to contact units 449 of contact arrangement 420, may also be referred to as connecting stator layers.

The stator assembly 100 is electrically conductively connected to a power module via the contact arrangement 420. The power module is embodied to provide the drive currents required to drive the rotor 1200. The power module may, for example, comprise one or more power-generating units to generate the drive currents. The power-generating units may e.g. be embodied as amplifiers or end stages, particularly as H-bridge circuits. Alternatively, the drive currents may also be generated by further modules of the stator module 10 and fed into the power module. The power module may also be referred to as a feed module.

Figure 12:
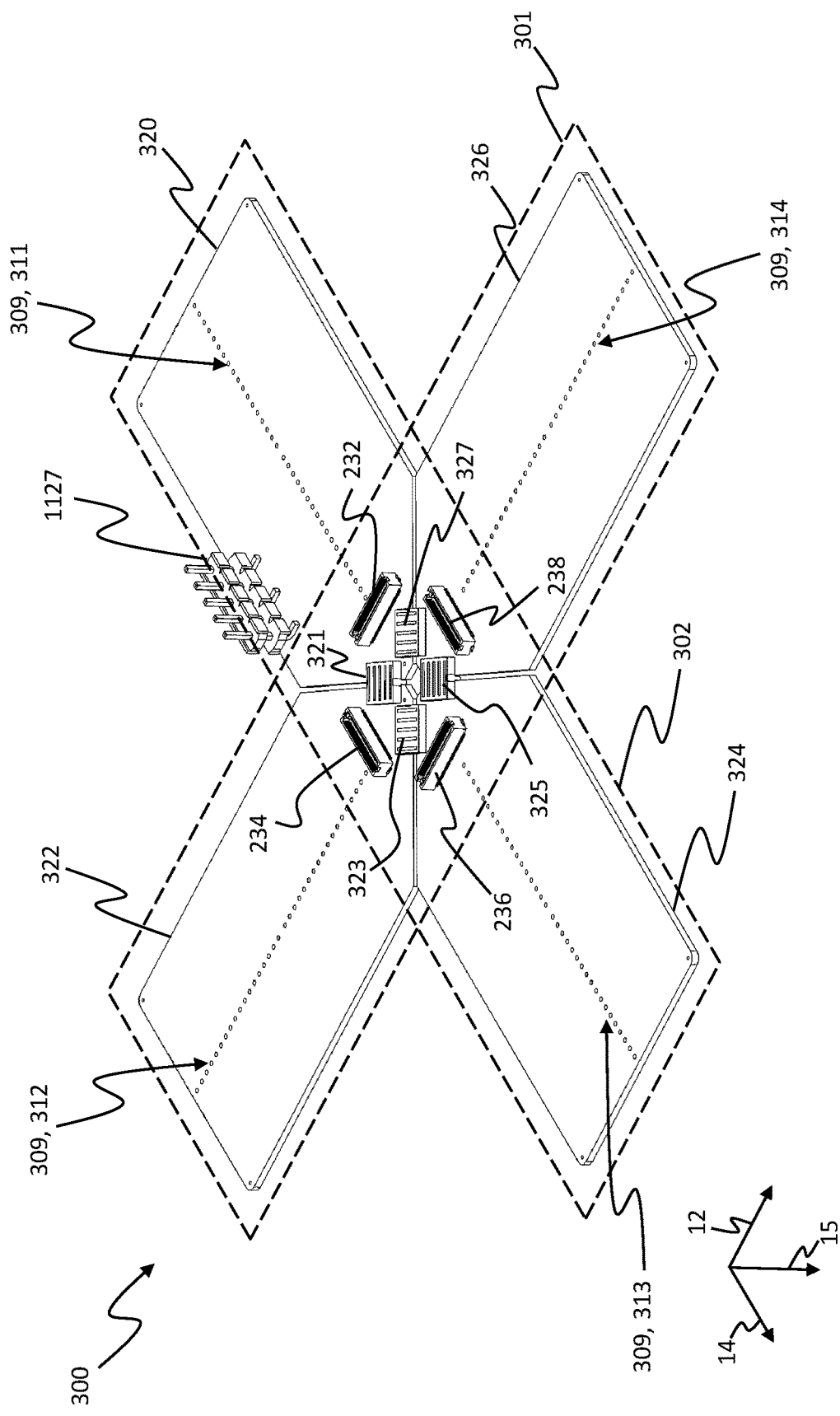
FIG. 12 shows a perspective view of a bottom side of a power module of the stator module.

FIG. 12 shows a schematic perspective view of the bottom side of the power module 300. The power module 300 is essentially flat on its bottom side. On the bottom side, electronic parts or components, particularly the power-generating units, may be arranged at the power module 300. The power module 300 is plate-shaped and embodied as a plate extending in the first and second direction 12, 14. An extension of the power module 300 in the first and second direction 12, 14 is respectively larger than an extension of the power module 300 in the vertical direction 15. The power module 300 may comprise a printed-circuit board comprising an arrangement of electronic parts or components.

The printed-circuit board of the power module 300 may have one or more copper layers in which conductor paths are formed for contacting the electronic components arranged on the printed-circuit board. The copper layers may have a thickness of 10 µm to 500 µm, in particular 50 µm to 100 µm, in particular 70 µm. The conductor paths may have a minimum width of 50 µm or 100 µm, in particular 200 µm or 300 µm.

The power module 300 is cross-shaped in the plane defined by the first and second direction 12, 14 with two bars 301, 302 oriented perpendicularly to each other and aligned along the first and second direction 12, 14. The bars 301, 302 of the power module 300 have the same extension in the first direction 12 and in the second direction 14. In particular, the power module 300 comprises a first bar 301 running along the first direction 12 and a second bar 302 running along the second direction 14.

The first bar 301 may have a width in the second direction 14 which is smaller than a width of the previously described stator assembly 100 in the second direction 14. In particular, the first bar 301 may have a width in the second direction 14 which is smaller than half the width of the stator assembly 100 in the second direction 14. The second bar 302 may have a width in the first direction 12 which is smaller than a width of the stator assembly 100 in the first direction 12. In particular, the second bar 302 may have a width in the first direction 12 which is smaller than half the width of the stator assembly 100 in the first direction 12.

The power module 300 comprises a first module unit 320, a second module unit 322, a third module unit 324 and a fourth module unit 326, each of which have a mechanically separate embodiment with regard to each other. Unless differences are described in the following, the module units 320, 322, 324, 326 have an identical embodiment. The first and third module unit 320, 324 form the second bar 302 of the cross-shaped power module 300 aligned along the second direction 14, the second and fourth module unit 322, 326 form the first bar 301 of the cross-shaped power module 300 aligned along the first direction 12.

The module units 320, 322, 324, 326 each have a rectangularly formed part in the plane spanned by the first and second direction 12, 14 in the top view of the bottom side of the module units 320, 322, 324, 326. At one side of the rectangular part, the base of a triangular part follows which, in a top view of the bottom side of the module units 320, 322, 324, 326, has essentially the shape of an isosceles triangle. The module units 320, 322, 324, 326 are arranged in a cross shape around a shared center, the tips of the triangular parts of the module units 320, 322, 324, 326 being arranged facing each other at the center. The first module unit 320 and the third module unit 324 are arranged opposite to each other in the second direction 14, wherein the tips of the triangular parts of the first and third module units 320, 322, 324 are each arranged facing each other at the center. The second module unit 322 and the fourth module unit 326 are arranged opposite to each other in the first direction 12, wherein the tips of the isosceles triangular parts of the second and fourth module units 322, 326 are each arranged facing each other at the center.

One leg of the triangular part of the second module unit 322 is arranged adjacent to one leg of the triangular part of the first module unit 320. A further leg of the triangular part of the second module unit 322 is arranged next to a leg of the triangular part of the third module unit 324. One leg of the triangular part of the fourth module unit 326 is arranged next to a further leg of the triangular part of the first module unit 320. A further leg of the triangular part of the fourth module unit 326 is arranged next to a further leg of the triangular part of the third module unit 324.

The module units 320, 322, 324, 326 are electrically connected to each other via connectors 321, 323, 325, 327. In addition, the connectors 321, 323, 325, 327 may be embodied to connect the module units 320, 322, 324, 326 to one another in a mechanically rigid manner. A first connector 321 connects the first module unit 320 to the second module unit 322, a second connector 323 connects the second module unit 322 to the third module unit 324, a third connector 325 connects the third module unit 324 to the fourth module unit 326 and a fourth connector 327 connects the fourth module unit 326 to the first module unit 320. In alternative embodiments, the power module 300 may be cross-shaped, but may be formed in one piece from a single continuous plate and without the module units 320, 322, 324, 326 and connectors 321, 323, 325, 327.

The connectors 321, 323, 325, 327 are each arranged at the legs of the triangular parts of the modular units 320, 322, 324, 326. The connectors 321, 323, 325, 327 each connect legs of adjacent module units 320, 322, 324, 326 arranged side by side.

The connectors 321, 323, 325, 327 may be embodied as electrical connectors, for example as PCB connectors. The connectors 321, 323, 325, 327 may also be embodied as press-fit PCB connectors. The connectors 321, 323, 325, 327 may, for example, be press-fitted on the bottom side of the module units 320, 322, 324, 326 in contact holes formed in the module units 320, 322, 324, 326. In particular, the connectors 321, 323, 325, 327 may form a solderless electrically conductive connection between the module units 320, 322, 324, 326.

The module units 320, 322, 324, 326 may each have an identical embodiment except for a coupling element 1127 arranged on the first module unit 320. In particular, the module units 320, 322, 324, 326 may each have identical dimensions and/or have an identical conductor-path layout, i.e. an identical conductor arrangement, and/or, apart from the coupling element 1127, be identically equipped with electronic components. In particular, a conductor arrangement of the first module unit 320, a conductor arrangement of the second module unit 322, a conductor arrangement of the third module unit 324 and a conductor arrangement of the fourth module unit 326 may each be embodied identically. In particular, all module units 320, 322, 324, 326 may have connecting contacts, e.g. solder contacts, for connecting the coupling element 1127, wherein only the first module unit 320 is equipped with the coupling element 1127. In alternative embodiments of the power module 300, the coupling element 1127 may also be arranged on one of the other module units 322, 324, 326 instead of on the first module unit 320. The power module 300 may be embodied to receive a supply energy for generating the drive currents for the coil conductors 125, 126 of the stator assembly 100 via the coupling element 1127.

The power module 309 comprises a connecting arrangement 309. The connecting arrangement 309 of the power module 300 may be cross-shaped, as the contact arrangement 420 of the stator assembly 100. The connecting arrangement 309 of the power module 300 comprises further contact holes with conductive coating, which may also be referred to as conductively coated through-holes or vias. The further contact holes of the connecting arrangement 309 of the power module 300 may be embodied like the contact holes of the contact arrangement 420 of the stator assembly 100.

The connecting arrangement 309 of the power module 300 in particular comprises a first connecting arrangement 311 with first further contact holes, a second connecting arrangement 312 with second further contact holes, a third connecting arrangement 313 with third further contact holes and a fourth connecting arrangement 314 with fourth further contact holes.

The first further contact holes of the first connecting arrangement 311 are arranged side by side along the first connecting arrangement 311 extending in the second direction 14. The second further contact holes of the second terminal array 312 are arranged side by side along the second terminal array 312 extending in the first direction 12. The third further contact holes of the third terminal 313 are arranged side by side along the third terminal 313 extending in the second direction 14. The fourth further contact holes of the fourth terminal array 314 are arranged side by side along the fourth terminal array 314 extending in the first direction 12.

As shown in FIG. 12, the cross-shaped connecting arrangement 309 of the power module 300 may be arranged along the central lines of the power module 300 extending in the first direction 12 and the second direction 14. In particular, the cross-shaped connecting arrangement 309 of the power module 300 may be arranged centrally on the bars 301, 302 of the cross-shaped power module 300. In particular, the first connecting arrangement 311 may be arranged centrally in the first direction 12 on the second bar 302 of the power module 300 oriented along the second direction 14, the second connecting arrangement 312 may be arranged centrally in the second direction 14 on the first bar 301 of the power module 300 oriented along the first direction 12, the third connecting arrangement 313 may be arranged in the first direction 12 centrally on the second bar 302 of the power module 300 oriented along the second direction 14 and opposite to the first connecting arrangement 311, and the fourth connecting arrangement 314 may be arranged in the second direction 14 centrally on the first bar 302 of the power module 300 aligned along the first direction 12 and opposite to the second connecting arrangement 312.

In the modular power module 300, the first connecting arrangement 311 is located on the first module unit 320, the second connecting arrangement 312 is located on the second module unit 322, the third connecting arrangement 313 is located on the third module unit 324 and the fourth connecting arrangement 314 is located on the fourth module unit 326 of the power module 300. The connecting arrangements 311, 312, 313, 314 are each arranged centrally on the module units 320, 322, 324, 326, in particular centrally on the rectangular parts of the module units 320, 322, 324, 326.

Figure 13:
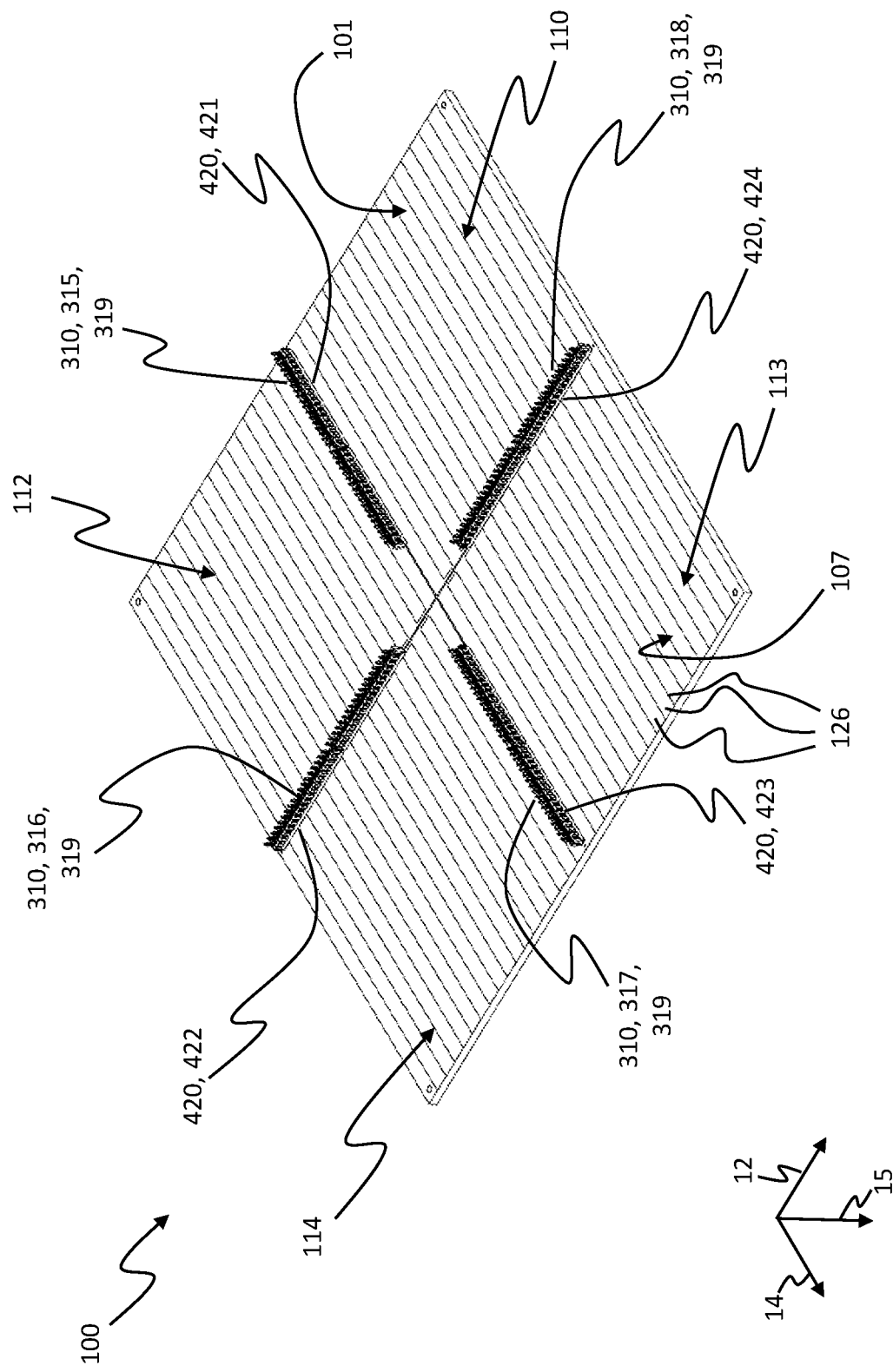
FIG. 13 shows a perspective view of a bottom side of the stator assembly of the stator module.

FIG. 13 shows a schematic perspective depiction at the bottom side of the stator assembly 100. The base surface 101 of the stator assembly 100 opposite to the stator surface 11 is flat. The further coil conductors 126 of the fourth stator layer 107 are arranged at the base surface 101. The bottom side of the stator assembly 100 may be free of electronic parts or components. The cross-shaped contact arrangement 420 may be contacted from the bottom side of the stator assembly 100. For example, the contact units 449, particularly contact holes or vias, of the contact arrangement 420 may be exposed on the bottom side of the stator assembly 100.

The stator assembly 100 and the power module 300 of the stator module 10 are electrically connected to each other in a conductive manner via a connecting line 310. The connecting line 310 is guided from the top of the power module 300 to the bottom and the base surface 101 of the stator assembly 100.

By the connecting line 310, the contact arrangement 420 of the stator assembly 100 is electrically conductively connected to the connecting arrangement 309 of the power module 300 shown in FIG. 12. The further contact holes of the connecting arrangement 309 of the power module 300 may be arranged directly below the contact holes of the contact arrangement 420 of the stator assembly 100 and be flush with the contact holes of the contact arrangement 420 of the stator assembly 100 in such a way that each contact hole in the stator assembly 100 is opposite to a wider contact hole in the stator module 300 aligned with the respective contact hole in the stator assembly 100, and vice versa.

In the stator module 10, the first connecting arrangement 311 of the power module 300 is located below the first contact structure 421 of the stator assembly 100, the second connecting arrangement 312 of the power module 300 is located below the second contact structure 422 of the stator assembly 100, the third connecting arrangement 313 of the power module 300 is located below the third contact structure 423 of the stator assembly 100, and the fourth connecting arrangement 314 of the power module 300 is located below the fourth contact structure 424 of the stator assembly 100. The connecting arrangements 311, 312, 313, 314 of the power module 300 are aligned in parallel to the respective contact structure 421, 422, 423, 424 of the stator assembly 100 arranged above.

The connecting line 310 is cross-shaped. The connecting line 310 comprises a connector 319 shown in FIG. 13, via which the connecting arrangement 309 of the power module 300 is electrically conductively connected to the contact arrangement 420 of the stator assembly 100. As shown in FIG. 13, the connector 319 comprises a first connector 315, which electrically conductively connects the first connecting arrangement 311 of the power module 300 to the first contact structure 421, in particular to the first contact-unit group 441 and the second contact-unit group 442 of the stator assembly 100, a second connector 316, which electrically conductively connects the second connecting arrangement 312 of the power module 300 to the second contact structure 422, in particular to the seventh contact-unit group 447 and with the eighth contact-unit group 448 of the stator assembly 100, a third connector 317 which electrically conductively connects the third connecting arrangement 313 of the power module 300 to the third contact structure 423, in particular with the fifth contact-unit group 445 and to the sixth contact-unit group 446 of the stator assembly 100, and a fourth connector 318 which electrically conductively connects the fourth connecting arrangement 314 of the power module 300 to the fourth contact structure 424, in particular to the third contact-unit group 443 and to the fourth contact-unit group 449 of the stator assembly 100.

The first connector 315 may generally also be referred to as a connector 315 of the stator module 100 and the fourth connector 318 may generally also be referred to as a further connector 318 of the stator assembly 100.

The power module 300 is mechanically fastened to the stator assembly 100 by connectors 315, 316, 317, 318. In particular, the power module 300 is fixed to the stator assembly 100 by connectors 315, 316, 317, 318, so that the power module 300 attached to the stator assembly 100 may be moved or rotated in any direction 12, 14, 15. In particular, the mechanical fastening of the power module 300 to the stator assembly 100 defines a distance in the vertical direction 15 between the power module 300 and the stator assembly 100.

The connecting line 310 may comprise one or a plurality of pin strips arranged in a cross shape. In particular, the connectors 315, 316, 317, 318, as shown in FIG. 13, may each comprise one or a plurality of pin strips. The pin strips comprise electrically conductive contact pins arranged side by side, which may be embodied as cylinders. The connectors 315, 316, 317, 318 are described in more detail in connection with FIG. 15.

The contact pins are arranged next to each other in the first and second direction 12, 14, in analogy to the contact holes of the contact structures 421, 422, 423, 424 of the stator assembly 100 and of the further contact holes of the connecting arrangements 311, 312, 313, 314 of the power module 300. In particular, the contact pins of the first connector 315 are arranged side by side along the second direction 14, the contact pins of the second connector 316 are arranged side by side along the first direction 12, the contact pins of the third connector 317 are arranged side by side along the second direction 14 and the contact pins of the fourth connector 318 are arranged side by side along the first direction 12.

The contact pins are arranged to engage with the further contact holes of the connecting arrangement 309 of the power module 300 and with the opposite contact holes of the contact arrangement 420 of the stator assembly 100 to establish an electrically conductive connection between the contact structures 421, 422, 423, 424 and the connecting arrangements 311, 312, 313, 314. The connectors 315, 316, 317, 318 comprising the contact pins may in particular be embodied as press-fit connectors, i.e. press-fit connectors, which are pressed into the contact holes in the stator assembly 100 and/or into the contact holes in the power module 300.

In particular, each module unit 320, 322, 324, 326 of the power module 300 may be electrically conductively connected via exactly one of the connectors 315, 316, 317, 318 to exactly one of the contact structures 421, 422, 423, 424 of the stator assembly 100. The first module unit 320 is connected to the first contact structure 421 of the stator assembly 100 via the first connector 315, the second module unit 322 is connected to the second contact structure 422 of the stator assembly 100 via the second connector 316, the third module unit 324 is connected to the third contact structure 423 of the stator assembly 100 via the third connector 317 and the fourth module unit 326 is connected to the fourth contact structure 424 of the stator assembly 100 via the fourth connector 318.

The first module unit 320 is electrically conductively connected to the coil conductors 125 of the first and second stator sectors 110, 112 oriented along the first direction 12 via the first connector 315 of the connecting line 310. The second module unit 322 is electrically conductively connected to the further coil conductors 126 of the second and fourth stator sectors 112, 114 oriented along the second direction 14 via the second connector 316 of the connecting line 310. The third module unit 324 is electrically conductively connected to the coil conductors 125 of the third and fourth stator sectors 113, 114 oriented along the first direction 12 via the third connector 317 of the connecting line 310. The fourth module unit 326 is electrically conductively connected to the further coil conductors 126 of the first and third stator sectors 110, 113 oriented along the second direction 14 via the fourth connector 318 of the connecting line 310.

If the connector 319 for connecting the contact structures 421, 422, 423, 424 of the stator assembly 100 to the connecting arrangements 311, 312, 313, 314 are embodied as press-fit connectors, the contact structures 421, 422, 423, 424 of the stator assembly 100 may each be arranged at such a distance from the center region 460 of the stator assembly 100, that when one of the module units 420, 422, 424, 426 is pressed with the stator assembly 100, a load on the other module units 420, 422, 424, 426 is prevented by a pressing tool arranged next to the connecting arrangements 311, 312, 313, 314.

Figure 14:
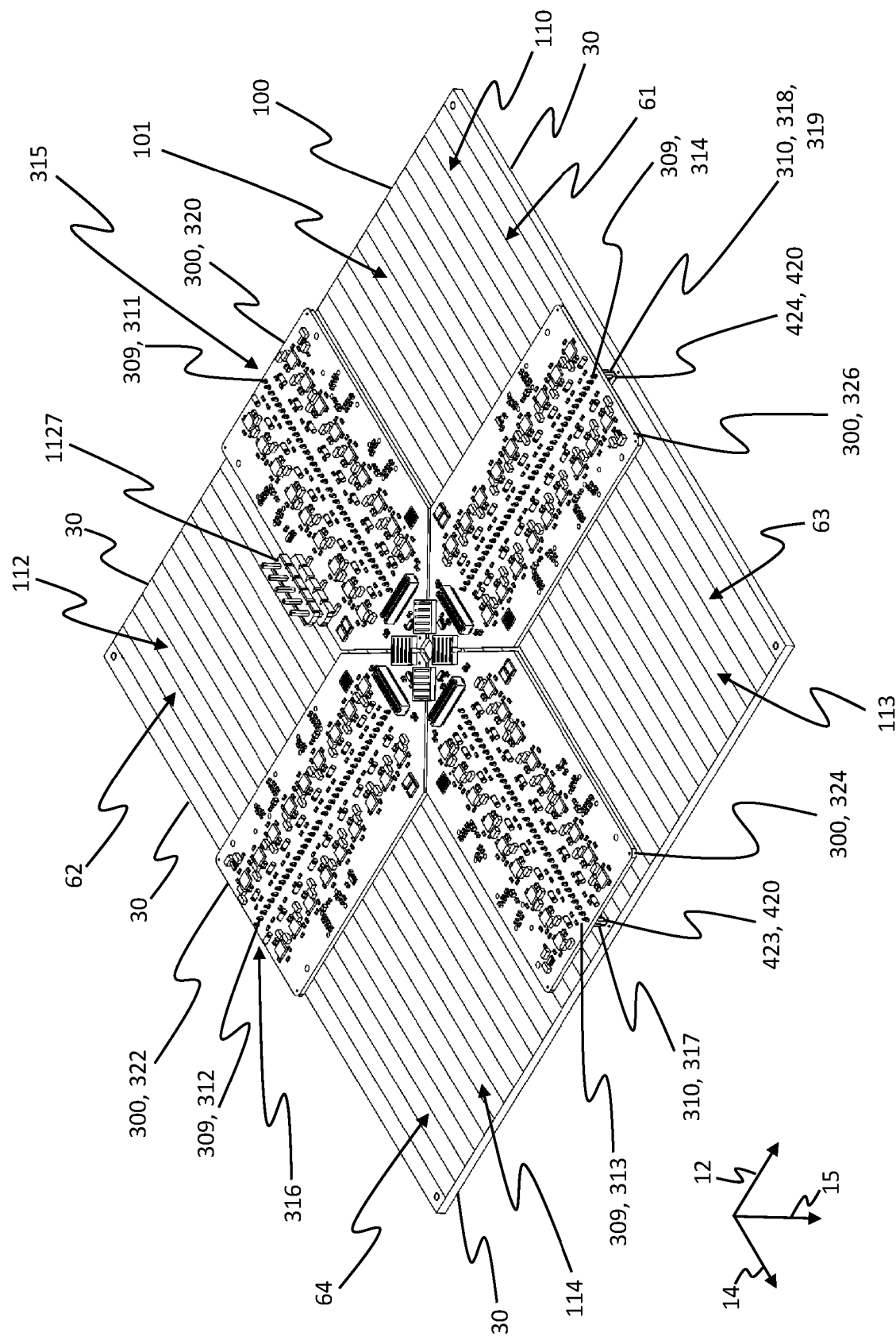
FIG. 14 depicts a perspective view of the bottom sides of the power module and of the stator assembly.

FIG. 14 shows a schematic perspective view of the bottom side of the power module 300 and of the bottom side of the stator assembly 100, wherein the power module 300 is connected to the stator assembly 100 via the connecting line 310 and wherein the stator assembly 100 is arranged on the upper side of the power module 300. FIG. 14 shows the electronic components arranged at the bottom of the power module 300.

The connecting line 310 may be embodied as a mechanically fixed or rigid connection between the power module 300 and the stator assembly 100. At the same time, the connecting line 310 may be embodied to be elastic enough to compensate for different thermal expansions, especially due to different thermal expansion coefficients, of the stator assembly 100 and of the power module 300 without loss of electrical contact. A mechanically firm and rigid connection with simultaneous compensation of different thermal expansions may be achieved, among other things, if the connecting line 310 comprises connectors 315, 316, 317, 318 having pin strips or press-fit connectors.

The stator assembly 100 and the power module 300 may be arranged at a fixed distance with regard to each other in the vertical direction 15, and the connecting line 310 may be embodied to electrically connect the stator assembly 100 and the power module 300 in a conductive manner over the distance. In particular, the connectors 315, 316, 317, 318 of the connecting line 310 may be embodied to fasten the stator assembly 100 to the power module 300 at the distance.

The distance may be such that between the stator assembly 100 and the power module 300, sufficient space is available for electronic components arranged on the top of the power module 300. The electronic components may in particular be embodied as integrated circuits. For example, the electronic components located on the upper side of the power module 300 between the power module 300 and the stator assembly 100 may include end stages or H-bridge circuits of the power-generating units for generating the drive currents.

A distance which provides sufficient installation space for electronic components is particularly provided in particular by the connecting line 310 having connectors 315, 316, 317, 318 embodied as pin strips or press-fit connectors. The distance may alternatively or additionally be such that electromagnetic coupling between the coil conductors 125, 126 of the stator assembly 100 and conductor surfaces or conductor paths on the power module 300 is minimized. This is the case, for example, in case of the connecting line 310 with connectors 315, 316, 317, 318 embodied as pin strips or press-fit connectors. The distance may be between 2 mm and 10 mm, in particular 5 mm.

In alternative embodiments of the stator module 10, the connector 319 may also comprise an electrical plug connector or a plurality of electrical connectors which connect the connecting arrangement 309 of the power module 300 and the contact arrangement 420 of the stator assembly 100 in an electrically conductive manner. Connectors 315, 316, 317, 318 with electrical plug connectors may also be embodied to connect the stator assembly 100 and the power module 300 over the distance required for the arrangement of electronic components and/or to have an elasticity required to compensate for different thermal expansions and/or to establish a mechanically rigid connection between the stator assembly 100 and the power module 300. In further alternative embodiments of the stator module 10, the connector 319 may also be embodied as a soldered connection, the connecting arrangement 309 of the power module 300 and the contact arrangement 420 of the stator assembly 100 being embodied as solder-contact surfaces and being electrically conductively connected via the soldered connection.

As shown in FIG. 14, the cross-shaped power module 300 covers the base surface 101 of the stator assembly 100 in the area of the cross-shaped contact arrangement 420 of the stator assembly 100. In particular, the power module 300 covers the contact arrangement 420 itself. A first free space 61 is formed above the first stator sector 110. In addition, as shown in FIG. 14, a second free space 62 may be formed above the second stator sector 112, a third free space 63 may be formed above the third stator sector 113 and a fourth free space 64 may be formed above the fourth stator sector 114. At the free spaces 61, 62, 63, 64, the base surface 101 of the stator assembly 100 is not covered by the power module 300, i.e. it is exposed, and the base surface 101 of the stator assembly 100 is accessible from the bottom side of the power module 300 at the free spaces 61, 62, 63, 64.

In the free spaces 61, 62, 63, 64, more than 30% of the base surface 101 of the stator assembly 100 may be accessed from the bottom of the power module 300. In particular, more than 40%, more than 50%, in particular 52% to 56%, in particular 54% of the base surface 101 of the stator assembly 100 may be accessible in the free spaces 61, 62, 63, 64. The first and third modular units 320, 324 may each have an extension of 30 mm to 120 mm in the first direction 12, in particular 40 mm to 80 mm, in particular 60 mm. The second and fourth module units 322, 326 may each have an extension of 30 mm to 120 mm, in particular of 40 mm to 80 mm, in particular of 60 mm, in the second direction 14.

The free spaces 61, 62, 63, 64 are arranged above the stator sectors 110, 112, 113, 114 in corner regions of the rectangular stator assembly 100, the corner regions respectively adjoining the outer edges 30 of the stator assembly 100 running along the first direction 12 and the outer edges 30 of the stator assembly 100 running along the second direction 14. The free spaces 61, 62, 63, 64 have a rectangular embodiment and extend in the first and second direction 12, 14 between one of the outer edges 30 of the stator assembly 100 and an outer edge of the power module 300, respectively.

The first free space 61 is adjacent to the first module unit 320 and to the fourth module unit 326. The first free space 61 is located or extends in the first direction 12 between the first module unit 320 and an outer edge 30 of the stator surface 11 extending in the second direction 14 and in the second direction 14 between the fourth module unit 326 and an outer edge 30 of the stator surface 11 extending in the first direction 12. The second free space 62 is adjacent to the first module unit 320 and the second module unit 322. The second free space 62 is located or extends in the first direction 12 between the first module unit 320 and an outer edge 30 of the stator surface 11 along the second direction 14, and in the second direction 14 between the second module unit 322 and an outer edge 30 of the stator surface 11 along the first direction 12.

The third free space 63 adjoins the third module unit 324 and the fourth module unit 326. The third free space 63 is located or extends in the first direction 12 between the third module unit 324 and an outer edge 30 of the stator surface 11 along the second direction 14, and in the second direction 14 between the fourth module unit 324 and an outer edge 30 of the stator surface 11 along the first direction 12. The fourth free space 64 is adjacent to the second module unit 322 and the third module unit 324. The fourth free space 64 is located or extends in the first direction 12 between the third module unit 324 and an outer edge 30 of the stator surface 11 along the second direction 14, and in the second direction 14 between the second module unit 322 and an outer edge 30 of the stator surface 11 along the first direction 12.

The first free space 61, the second free space 62, the third free space 64 and/or the fourth free space 64 may have an extension in the first direction that is larger than an extension of the second bar 302 of the power module 300 in the first direction 12. The first free space 61, the second free space 62, the third free space 64 and/or the fourth free space 64 may have an extension in the second direction 14 that is larger than an extension of the first bar 301 of the power module in the second direction 14.

The bars 301, 302 of the power module 300 are each arranged at a distance from the outer edges 30 of the stator assembly 100. In particular, the first bar 301 is arranged in the first direction 12 at a distance from the outer edges 30 of the stator assembly 100 aligned along the second direction 14 and the second bar 302 is arranged in the second direction 14 at a distance from the outer edges 30 of the stator assembly 100 aligned along the first direction 12. This enables the stator assembly 100 to be arranged on the top of the module housing 19 of the stator module 10 in such a way that the outer edges 30 of the stator assembly 100 are in the vertical direction 15 arranged in a plane with the side faces 34 of the module housing 19, and at the same time the power module 300 may in the first and second directions 12, 14 be enclosed by a rim running around the side faces 34 of the module housing 19.

The power module 300 shown in FIGS. 12 and 14 is modularly composed of the four module units 320, 322, 324, 326. Compared to an integral, cross-shaped version of the power module 300, there is less waste in the manufacture of the four module units 320, 322, 324, 326 in relation to the board or circuit board of the power module 300 in the modular version of the power module 300 shown in FIGS. 12 and 14. In addition, the connector 319 may each be embodied as press-fit connectors and, when forming the connecting line 310, may each be pressed individually and successively with the relevant module unit 320, 322, 324, 326 and the stator assembly 100. In this way, tilting of the connector 319, which may easily occur when pressing several connectors 315, 316, 317, 318 simultaneously, may be avoided during the pressing process. Moreover, with a modular power module 300 consisting of the module units 320, 322, 324, 326, the connectors 315, 316, 317, 318 and the power module 300 may be pressed using a small amount of force.

The power module 300 has a power-generating unit which is embodied to generate the drive current driving the rotor 1200 from a drive power provided via the coupling element 1127. The power-generating unit is embodied to generate a drive current applied as alternating current to the coil conductors 125, 126 from the drive power provided via the coupling element 1127. The power-generating unit may be embodied to provide the drive current as a pulsed drive current, in particular as a pulse-width modulated drive current. In order to generate the drive current, the power-generating unit may include switching units, in particular transistors.

The power module 300 may have further power-generating units in addition to the mentioned power-generating unit. The power module may be embodied to generate a separate drive current for each coil conductor 125, 126 that may be individually energized via the contact units 449. In particular, the power module 300 may have a separate power-generating unit for each coil conductor 125, 126 which may be individually energized. For example, the power module 300 may have a separate power-generating unit for each individual phase of the multi-phase systems of the stator assembly 100 in order to generate a phase current for the corresponding phase as a drive current. For example, the power module 300 may have a separate power-generating unit for each of the three phases of a three-phase system of interconnected coil conductors 125, 126. The power-generating units may be embodied as output stages, in particular as H-bridge circuits or power transistors. The power-generating units may be embodied as electronic components, in particular as integrated circuits, which are arranged on the printed-circuit board or on the boards of the power module 300, in particular on the upper side and/or the bottom side of the power module 300.

Each stator sector 110, 112, 113, 114 may respectively comprise a first number of multi-phase systems, the coil conductors of which extend 125 along the first direction 12, and a second number of multi-phase systems, the further coil conductors 126 of which extend along the second direction 14. The first and second number may be equal. The multi-phase systems may each comprise a third number of individual phases. The power module 300 may comprise a power-generating unit for each of the individual phases of the multi-phase systems. In total, the power module 300 may thus comprise a total number of power-generating units per stator sector 110, 112, 113, 114, which corresponds to the sum of the product of the first and third number and the product of the second and third number.

The coil conductors 125, 126 of the stator assembly 100 may e.g. be interconnected to a total of twenty-four three-phase systems, each stator sector 110, 112, 113, 114 comprising six three-phase systems each. Of the six three-phase systems of a sector 110, 112, 113, 114, three may each consist of 12 coil conductors 125 extending in the first direction and three each of 126 further coil conductors 126 extending in the second direction 14. In the case of a stator assembly 100 with twenty-four three-phase systems, the power module 300 may comprise seventy-two power-generating units for generating seventy-two driving or phase currents.

The module units 320, 322, 324, 326 each comprise all power-generating units necessary for generating the drive currents for the coil conductors 125, 126 connected to the respective module unit 320, 322, 324, 326. The first module unit 320 comprises all power-generating units which generate the drive currents in the coil conductors 125 of the first and second stator sectors 110, 112 aligned along the first direction 12 and may be referred to as first power-generating units. The second module unit 322 comprises all power-generating units which generate the driving currents in the further coil conductors 126 of the second and fourth stator sectors 112, 114 aligned along the second direction 14 and may be referred to as second power-generating units. The third module unit 324 comprises all power-generating units which generate the drive currents in the coil conductors 125 of the third and fourth stator sectors 113, 114 aligned along the first direction 12 and may be referred to as third power-generating units. The fourth module unit 326 comprises all power-generating units which generate the drive currents in the further coil conductors 126 of the first and third stator sectors 110, 113 aligned along the second direction 14 and may be referred to as fourth power-generating units.

Each of the four module units 320, 322, 324, 326 may each comprise a total number of power-generating units corresponding to twice the product of the first number of multi-phase systems with further coil conductors 126 extending along the second direction 14 and the third number of individual phases per multi-phase system, or twice the product of the second number of multi-phase systems with coil conductors 125 extending along the first direction 12 and the third number of individual phases per multi-phase system.

Each of the module units 320, 322, 324, 326 may comprise eighteen power-generating units for generating eighteen drive currents. The eighteen drive currents may be generated as three phases of six three-phase systems.

The power-generating units are connected to the coil conductors 125, 126 of the stator assembly 100 via drive power lines to transmit the drive currents. The drive power lines are embodied as part of the connecting line 310. The drive power lines are each routed via the connector 319 of connecting line 310. The first power-generating units of the first module unit 320 are connected to the coil conductors 125 of the first and second stator sectors 110, 112 oriented in the first direction 12 via the drive power lines guided in the first connector 315. The second power-generating units of the second module unit 322 are connected via the drive current lines guided in the second connector 316 to the further coil conductors 126 of the second and fourth stator sectors 112, 114 oriented in the second direction 14. The third power-generating units of the third module unit 324 are connected via the drive current lines guided in the third connector 317 to the coil conductors 125 of the third and fourth stator sectors 113, 114 oriented in the first direction 12. The fourth power-generating units of the fourth module unit 326 are connected via the drive-current lines guided in the fourth connector 318 to the further coil conductors 126 of the first and third stator sectors 110, 113 oriented in the second direction 14.

If the power module 300, in contrast to FIGS. 12 and 14, is not made up of the module units 320, 322, 324, 326, but is constructed in one piece, the power-generating units are connected to the stator module 100 in the same way as the power-generating units arranged on the module units 320, 322, 324, 326. In particular, the first power-generating units and the third power-generating units are arranged on the second bar 302 of the power module 300 and the second and fourth power-generating units are arranged on the first bar 301 of the power module 300.

The stator module 10 may be embodied to generate drive currents having a current strength of more than 5 A, in particular more than 10 A. The current strength of the drive currents may, for example, be 20 A or 16 A or 15 A in continuous operation. For a power module 300 comprising a printed-circuit board, a metallization thickness of the conductor-paths carrying the drive current may be 35 μm to 200 μm, particularly 50 μm to 100 μm, particularly 70 μm. In particular, one, a plurality of or all layers of the power module 300 may have the same metallization thickness as the conductor paths carrying the drive current.

In the stator module 10, the individual modules formed by the power module 300 and the stator assembly 100 are each embodied as flat plates extending in the first and second direction 12, 14. By arranging the plate-shaped individual modules on top of one another in the vertical direction 15, a particularly flat design of the stator module 10 may be realized.

In the stator module 10, the power module 300 is dimensioned and shaped in such a way that the power module 300 does not completely extend over the entire width of the stator module 10 in either the first direction 12 or the second direction 14 and covers the entire cross-sectional surface of the stator module 10 in the first and second direction 12, 14. The merely incomplete covering of the cross-sectional area may be achieved in case of the power module 300 by its cross shape and the free spaces 61, 62, 63, 64 resulting from the cross shape.

The merely incomplete covering of the cross-sectional surfaces of the stator module 10 in the plane of the power module 300 allows for realizing a heat-conductive connection between the base surface 101 of the stator assembly 100 and a support area on the bottom side 9 of the stator module 10. The heat-conductive connection may thereby be produced over large contact surfaces.

Figure 15:
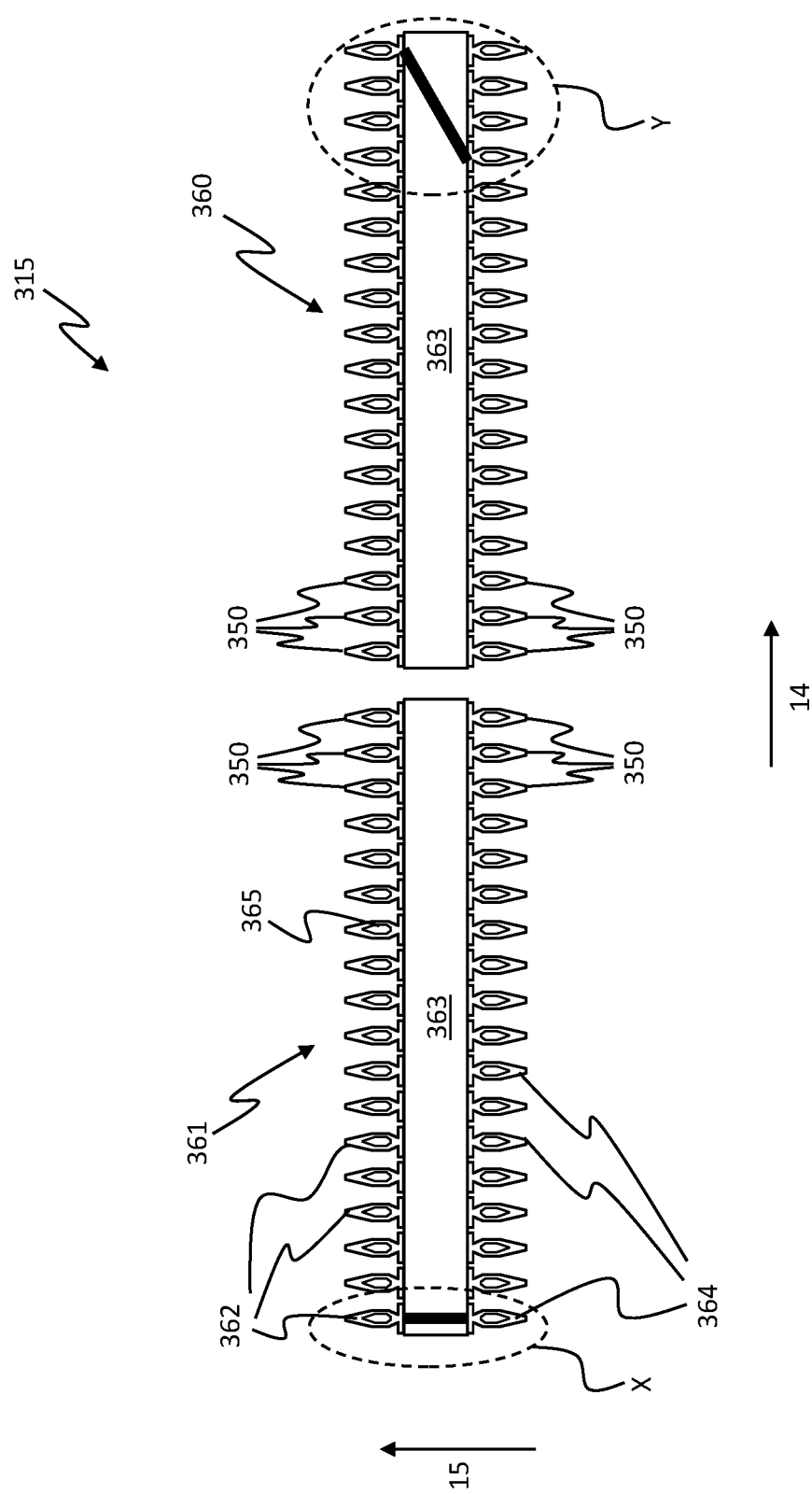
FIG. 15 is a view of a first connector of the stator module.

FIG. 15 shows a schematic view of the first connector 315 from the first direction 12. Unless differences are described below, the second, third and fourth connectors 316, 317, 318 are embodied identically to the first connector 315.

The first connector 315 comprises a first contact-pin strip 360 and a second contact-pin strip 361. The first and second contact-pin strips 360, 361 each comprise a plurality of interconnected contact pins 350. In particular, the contact-pin strips 360, 361 may each comprise eighteen contact pins 350. The first contact-pin strip 360 may also have more or less contact pins 350 than the second contact-pin strip 361. In alternative embodiments of the connector 315, the connector 315 may also only include the first contact-pin strip 360.

The contact-pin strips 360, 361 each comprise a strip body 363, in which or on which the contact pins 350 are arranged in an electrically insulated manner and at a distance from each other. The contact pins 350 may e.g. be arranged at regular intervals. The contact pins 350 protrude beyond the strip body 363 in the vertical direction 15 on both sides of the strip body 363. The sections of the contact pins 350 arranged in the vertical direction 15 above the strip body 363 form first contact areas 362 of the contact pins 350 and the sections of the contact pins 350 arranged in the vertical direction 15 below the strip body 363 form second contact areas 364 of the contact pins 350. The first contact area 362 and the second contact area 364 of the individual contact pins 350 are each electrically conductively connected to one another, which is exemplarily shown in region X. In alternative embodiments of the contact-pin strips 360, 361, a linear, direct association or, respectively, electrical connection is not required in the vertical direction 15 between the respective contact pins 350 of the first contact area 362 and the second contact area 364. Here, contact pins 350 of the first contact area 362 and of the second contact area 364 arranged at a distance from one another may be electrically connected to one another in the second direction 14, as well. This alternative embodiment is exemplarily shown in region Y.

The first contact areas 362 of the contact pins 350 are arranged to engage in the contact holes of the stator assembly 100 and the second contact areas 364 of the contact pins 350 are arranged to engage in the further contact holes of the power module 200. In addition, the contact pins 350 may be mechanically fixed to the stator assembly 100 via the first contact area 362 and to the power module 300 via the second contact area 364.

In particular, the contact pins 350 may be frictionally connected to the stator assembly 100 in the first contact areas 362 and/or to the power module 300 in the second contact areas 364. The contact pins 350 may be embodied to be pressed into the contact holes of the stator assembly 100 and/or into the other contact holes of the power module 300. For this purpose, the contact pins 350 may in the first and/or the second contact area 362, 364 be embodied as press-fit connectors. In particular, the contact pins 350 may be embodied in the first and/or in the second contact areas 362, 364, as shown in FIG. 15, wherein a diameter of the spring contacts 365 in an unstressed state is larger than a diameter of the contact holes of the stator assembly 100 and/or of the power module 300 and wherein the diameter of the spring contacts 365 in the compressed state may be reduced to a diameter which is smaller than the diameter of the contact holes of the stator assembly 100 and/or of the further contact holes of the power module 300.

In alternative embodiments of the first connector 315, the first contact area 362 and/or the second contact area 364 of the contact pins 350 may also be fixed in the contact holes of the stator assembly 100 and/or in the further contact holes of the power module 300 by a fixing agent, for example by an adhesive or a solder. The fixing agent may be arranged in or around the contact holes of the stator assembly 100 and/or in the further contact holes of the power module 300 and/or between the strip body 363 and the stator assembly 100 and/or between the strip body 363 and the power module 300. In particular, the first connector 315 may be attached to the stator assembly 100 by a frictional connection between the first contact areas 362 and the stator assembly 100 and to the power module 300 by a fixing agent, in particular by a solder arranged in the second contact areas 364.

In the stator assembly 100, no contact units 449 and connectors 315, 316, 317 are arranged in the central region 460. In alternative embodiments of the stator assembly 100, however, one or a plurality of the connector 319 may be arranged in the central region 460, as well.

Figure 16:
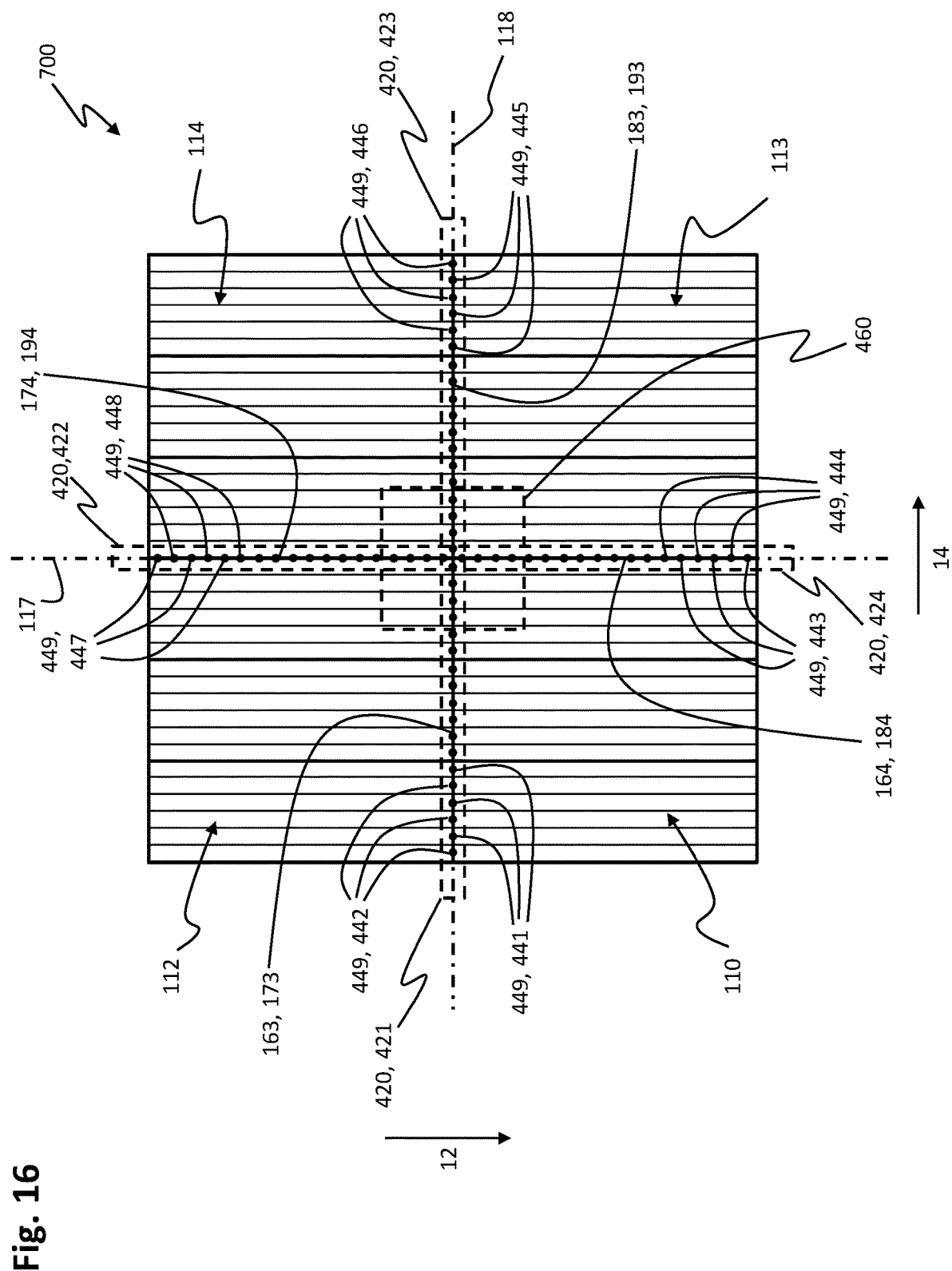
FIG. 16 shows a view of a first further stator assembly.

FIG. 16 shows a top view onto a first further stator assembly 700. Unless differences are described below, the first additional stator assembly 700 is embodied as the stator assembly 100.

In the first further stator assembly 700, the contact units 449 of the first contact-unit group 441 and the contact units 449 of the second contact-unit group 442 are distributed over the entire length of the first inner edge 163 of the first stator sector 110 and over the entire length of the first inner edge 173 of the second stator sector 112. Accordingly, the contact units 449 of the third contact-unit group 443 and the contact units 449 of the fourth contact-unit group 444 are distributed over the entire length of the second inner edge 164 of the first stator sector 110 and over the entire length of the second inner edge 184 of the third stator sector 113. The contact units 449 of the fifth contact-unit group 445 and the contact units 449 of the sixth contact-unit group 446 are distributed over the entire length of the first inner edge 183 of the third stator sector 113 and over the entire length of the first inner edge 193 of the fourth stator sector 114. The contact units 449 of the seventh contact-unit group 447 and the contact units 449 of the eighth contact-unit group 448 are distributed over the entire length of the second inner edge 174 of the second stator sector 112 and over the entire length of the second inner edge 194 of the fourth stator sector 114. In particular, some of the contact units 449 of the further stator assembly 700 are arranged in the central region 460 of the other stator assembly 700.

Accordingly, the connectors 315, 316, 317, 318 in the first further stator assembly 700 each extend over the entire length of the inner edges 163, 164, 173, 174, 183, 184, 193, 194 of the stator sectors 110, 112, 113, 114.

In the stator assembly 100 shown in FIG. 11, the contact-unit groups 441, 442, 443, 444, 445, 446, 447, 448, in particular the contact units 449 of the contact-unit groups 441, 442, 443, 444, 445, 446, 447, 448 and the connectors 315, 316, 317, 318 are each arranged in rows on the first and second central lines 117, 118 of the stator assembly 100. In the case of alternative embodiments of the stator assembly 100, the contact-unit groups 441, 442, 443, 444, 445, 446, 447, 448 or the contact units 449 may also be arranged entirely or partly next to the central lines 117, 118 at the inner edges 163, 164, 173, 174, 183, 184, 193, 194 of the stator sectors 110, 112, 113, 114.

Figure 17:
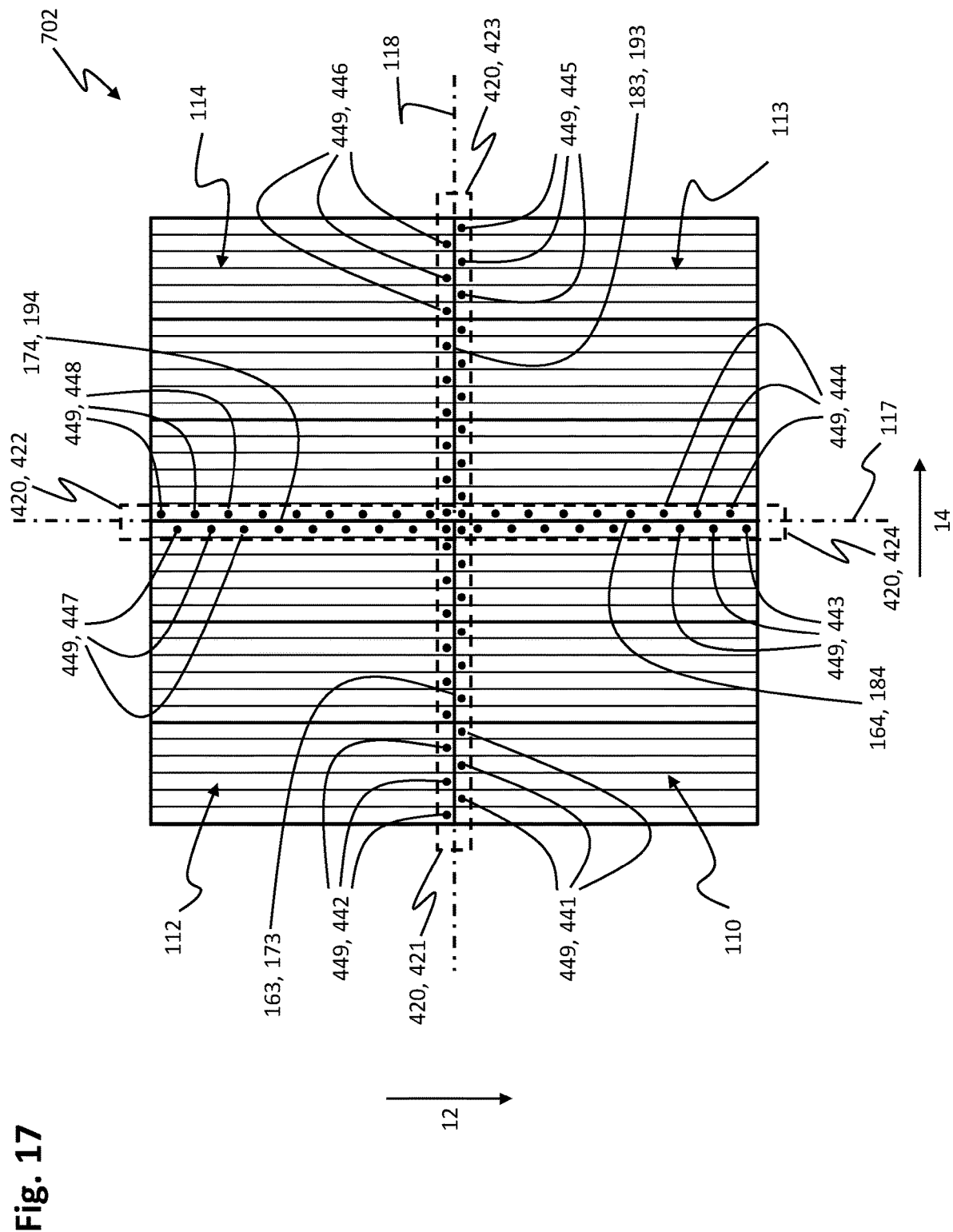
FIG. 17 depicts a top view of a second further stator assembly.

FIG. 17 shows a top view onto a second further stator assembly 702. Unless differences are described in the following, the second further stator assembly 702 is embodied like the stator assembly 100. In particular, in the second further stator assembly 702, the first contact structure 421 is arranged at the first inner edge 163 of the first stator sector 110 and at the first inner edge 173 of the second stator sector 112. The fourth contact structure 424 is arranged at the second inner edge 164 of the first stator sector 110 and at the second inner edge 184 of the third stator sector 113, the third contact structure 423 is arranged at the first inner edge 183 of the third stator sector 113 and at the first inner edge 193 of the fourth stator sector 114, and the second contact structure 422 is arranged at the second inner edge 174 of the second stator sector 112 and at the second inner edge 194 of the fourth stator sector 114.

In the second further stator assembly 702, the contact units 449 of the contact structures 421, 422, 423, 424 are each arranged adjacent to the inner edges 163, 164, 173, 174, 183, 184, 193, 194 of the stator sectors 110, 112, 113, 114. In particular, the contact units 449 of the first contact-unit group 441 are arranged at an offset in the direction of the first stator sector 110 on the first inner edges 163, 174 of the first and second stator sectors 110, 112. The contact units 449 of the second contact-unit group 442 are arranged at an offset in the direction of the second stator sector 112 at the first inner edges 163, 173 of the first and second stator sectors 110, 112. The contact units 449 of the third contact-unit group 443 are arranged at an offset in the direction of the first stator sector 110 at the second inner edges 164, 184 of the first and third stator sectors 110, 113 and the contact units 449 of the fourth contact-unit group 444 are arranged at an offset in the direction of the third stator sector 113 at the second inner edges 164, 184 of the first and third stator sectors 110, 113.

Furthermore, the contact units 449 of the fifth contact-unit group 445 are arranged at an offset in the direction of the third stator sector 113 at the first inner edges 183, 193 of the third and fourth stator sectors 113, 114 and the contact units 449 of the sixth contact-unit group 446 are arranged at an offset in the direction of the fourth stator sector 114 at the first inner edges 183, 193 of the third and fourth stator sectors 113, 114. The contact units 449 of the seventh contact-unit group 447 are arranged at an offset in the direction of the second stator sector 112 at the second inner edges 174, 194 of the second and fourth stator sectors 112, 114 and the contact units 449 of the eighth contact-unit group 448 are arranged at an offset in the direction of the fourth stator sector 114 at the second inner edges 174, 194 of the second and fourth stator sectors 112, 114.

In the second further stator assembly 702, too, the connectors 315, 316, 317, 318 may comprise contact pins 350 arranged side by side, wherein the contact pins 350 of the individual connectors 315, 316, 317, 318 50 are arranged side by side in two rows. The contact pins 350 of the two rows may be arranged in or at a shared strip body 363 or alternatively in or at strip bodies 363 which are embodied separately with regard to one another.

Figure 18:
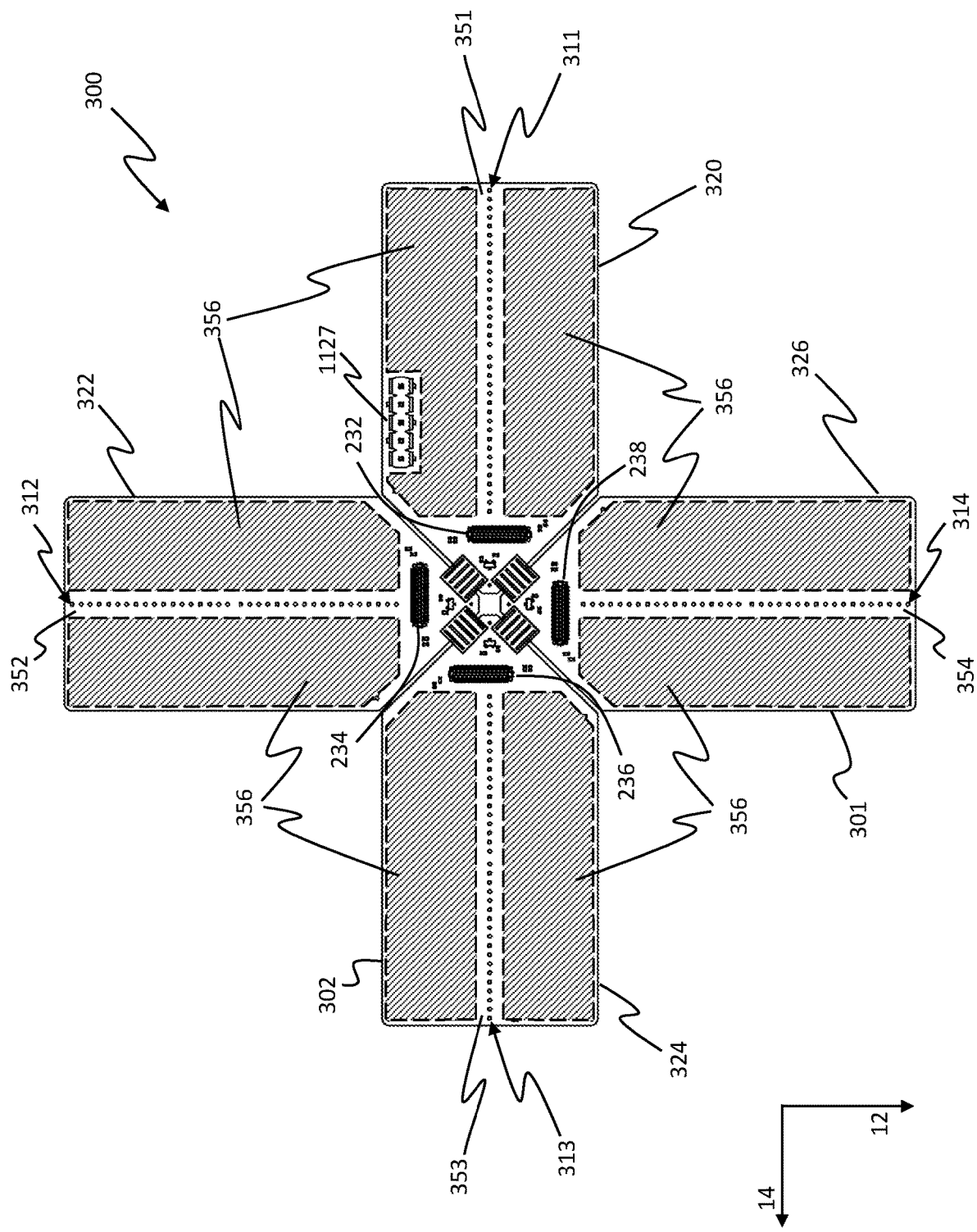
FIG. 18 is a further top view of the bottom side of the power module.

FIG. 18 shows a further schematic top view of the bottom side of the power module 300. The power module 300 has a first pressing surface 351 arranged in the second direction 14 along the further contact holes of the first connecting arrangement 311, a second pressing surface 352 arranged in the first direction 12 along the further contact holes of the second connecting arrangement 312, a third pressing surface 353 arranged in the second direction 14 along the further contact holes of the third connecting arrangement 313 and a fourth pressing surface 354 arranged in the first direction 12 along the further contact holes of the fourth connecting arrangement 314.

At the pressing surfaces 351, 352, 353, 354, no electronic components are arranged at the bottom side of the power module 300, so that the pressing surfaces 351, 352, 353, 354 of the power module 300 are formed free of electronic components. In particular, the power module 300 may have a flat, even bottom side at the pressing surfaces 351, 352, 353, 354. The first and third pressing surfaces 351, 353 are, with regard to their dimensions in the first direction 12 such that a pressing tool for frictionally connecting the first or third connectors 315, 317 to the power module 300 or the stator assembly 100 may be arranged on the first or third pressing surface 351, 353 next to the first or third connectors 315, 317. The second and the fourth pressing surface 352, 354 are, with regard to their dimension, in the second direction 14 such that the pressing tool for frictionally connecting the second or the fourth connector 316, 318 to the power module 300 or to the stator assembly 100 may be arranged on the second or the fourth pressing surface 352, 354 next to the second or to the fourth connector 312, 318.

In addition to the pressing surfaces 351, 352, 353, 354, in particular between the pressing surfaces 351, 352, 353, 354 and the outer edges of the power module 300, the power module 300 has respective fitting areas 356 for the arranging of electronic components at the bottom side of the power module 300. The fitting areas 356 extend in the first direction 12, in particular between the first or third pressing surface 351, 353 and the outer edges extending along the second direction 14, in particular the outer edges of the second bar 302 of the power module 300 extending along the second direction 14. The fitting areas 356 extend in the second direction 14 in particular between the second or fourth pressing surface 352, 354 and the outer edges extending along the first direction 12, in particular the outer edges of the first bar 301 of the power module 300 extending along the first direction 12.

The first and the third pressing surfaces 351, 353 may each have an extension between 3 mm and 11 mm, in particular of 7 mm, in the first direction 12. The second and fourth pressing surfaces 352, 354 may each have an extension between 3 mm and 11 mm, in particular of 7 mm, in the second direction 14.

By arranging the electronic components of the power module 300 in the fitting areas 356 of the power module 300 by the connectors 315, 316, 317, 318 arranged in the pressing surfaces 351, 352, 353, 354, it may be prevented that the area of the power module 300 carrying the electronic components is deformed during pressing and the electronic components are damaged or detached.

The power module 300 may be connected to a control module of the stator module 10 via a further connecting line. The control module may be embodied to provide control signals to control the power-generating units arranged on the power module 300. The control module may, for example, comprise one or a plurality of control units for generating the control signals. The control units may, for example, be embodied as network subscribers in a data network by which control data for controlling the planar-drive system are transmitted. In addition, the control module may be embodied to generate sensor signals for detecting a position of the rotor 1200 above the stator surface 11. For example, the control module may comprise one or a plurality of position-detecting units that interact with the rotor 1200. The control module may also be referred to as the sensor module of stator module 10.

The further connecting line comprises a first coupling element 232, a second coupling element 234, a third coupling element 236 and a fourth coupling element 238. The coupling elements 232, 234, 236, 238 each provide an electrically conductive connection between the control module and the power module 300 for transmitting the control signals. The coupling elements 232, 234, 236, 238 may each be embodied as elements of a plug connection, in particular as plugs or sockets. The coupling elements 232, 234, 236, 238 may also be embodied as integral connections between the power module 300 and the control module. Coupling elements 232, 234, 236, 238 may be used to mechanically connect the power module 300 and the control module 200.

The first coupling element 232 is arranged on the second bar 302 of the power module 300 in the region of the first connecting arrangement 311, the second coupling element 234 is arranged on the first bar 301 of the power module 300 in the region of the second connecting arrangement 312, the third coupling element 236 is arranged on the second bar 302 of the power module 300 in the region of the third connecting arrangement 312 and the fourth coupling element 238 is arranged on the first bar 301 of the power module 300 in the region of the fourth connecting arrangement 314.

First control signals for controlling the first power-generating units of the power module 300 are transmitted from the control module to the power module 300 via the first coupling element 232, second control signals for controlling the second power-generating units of the power module 300 are transmitted from the control module to the power module 300 via the second coupling element 234, via the third coupling element 236, third control signals for controlling the third power-generating units of the power module 300 are transmitted from the control module to the power module 300 via the third coupling element 236, and fourth control signals for controlling the fourth power-generating units of the power module 300 are transmitted from the control module to the power module 300 via the fourth coupling element 238.

If the power module 300 comprises the module units 320, 322, 324, 326, the module units 320, 322, 324, 326 may each be connected separately and individually to the control module in an electrically conductive manner via electrically insulated sub-lines of the further connecting line. The sub-lines each comprise one of the coupling elements 232, 234, 236, 238 and may include a corresponding counter element on the control module. The first coupling element 232 is arranged on the first module unit 320, the second coupling element 234 on the second module unit 322, the third coupling element 236 on the third module unit 324 and the fourth coupling element 238 on the fourth module unit 326. The further connecting line contacts the power module 300 in the middle near the crossing point of the first and second bar 301, 302. For this purpose, the coupling elements 232, 234, 236, 238 are arranged in the middle of the power module 300. The coupling elements 232, 234, 236, 238 are arranged in the triangular parts of the module units 320, 322, 324, 326.

In the case of alternative embodiments, the further connecting line, in particular its coupling elements 232, 234, 236, 238, may also be arranged in an outer region, in particular in a region at the ends of bars 301, 302 of the power module 300. In particular the coupling elements 232, 234, 236, 238 may be arranged in the rectangular area of the module units 320, 322, 324, 326 of the power module 300. For example, the coupling elements 232, 234, 236, 238 may be arranged at the shared center of the module units 320, 322, 324, 326 opposite to the outer ends of the module units 320, 322, 324, 326.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of Reference Numerals: 1-238

1 planar-drive system
3 further planar-drive system
8 upper side
9 bottom side
10 stator module
11 stator surface
12 first direction
14 second direction
15 vertical direction
18 connecting line
19 module housing
30 outer edge of stator surface
32 side face of stator assembly
34 side face of module housing
36 side face of stator module
41 first outer edge of stator surface
42 second outer edge of stator surface
43 third outer edge of stator surface
44 fourth outer edge of stator surface
61 first free space
62 second free space
63 third free space conductor
64 fourth free space
100 stator assembly
101 base surface
104 first stator layer
105 second stator layer
106 third stator layer
107 fourth stator layer
109 connecting stator layer
110 first stator sector
112 third stator sector
113 second stator sector
114 fourth stator sector
117 first central line
118 second central line
119 crossing point
120 first stator segments
121 second stator segments
122 inner stator segment
125 coil conductor
126 further coil conductors
131 first forward conductor
132 first return conductor
141 second forward
142 second return conductor
146 third forward conductor
147 third return conductor
150 first three-phase systems TABLE 1-continued List of Reference Numerals: 1-238

151 second three-phase systems
152 first side
153 first side
154 first connecting point
155 second connecting point
156 third connecting point
157 neutral point
161 first outer edge
162 second outer edge
163 first inner edge
164 second inner edge
171 first outer edge
172 second outer edge
173 first inner edge
174 second inner edge
181 first outer edge
182 second outer edge
183 first inner edge
184 second inner edge
191 first outer edge
192 second outer edge
193 first inner edge
194 second inner edge
232 first coupling element
234 second coupling element
236 third coupling element
238 fourth coupling element

TABLE 2

List of Reference Numerals: 300-1240

300 power module
301 first bar
302 second bar
309 connecting arrangement
310 connecting line module
311 first connecting arrangement
312 second connecting arrangement
313 third connecting arrangement
314 fourth connecting arrangement
315 first connector
316 second connector
317 third connector group
318 fourth connector
319 connector
320 first module unit
321 first connector
322 second module unit
323 second connector
324 third module unit
325 third connector
326 fourth module unit
327 fourth connector
340 upper side of power
341 bottom side of power module
350 contact pin group
351 first pressing surface
352 second pressing surface
353 third pressing surface
354 fourth pressing surface
354 fitting area
360 first contact-pin strip
361 second contact-pin strip
362 first contact areas
363 strip body
364 second contact areas
420 contact arrangement
421 first contact structure
422 second contact structure
423 third contact structure
424 fourth contact structure
441 first contact-unit group
442 second contact-unit
443 third contact-unit group TABLE 2-continued List of Reference Numerals: 300-1240

444 fourth contact-unit group
445 fifth contact-unit group
446 sixth contact-unit group
447 seventh contact-unit
448 eighth contact-unit group
449 contact unit
460 center area
700 first further stator assembly
702 second further stator assembly
1127 coupling element
1200 rotors
1201 magnet arrangement
1206 first rotor direction
1208 second rotor direction
1210 first magnet unit
1211 drive magnet
1220 second magnet unit
1221 further drive magnet
1230 third magnet unit
1240 fourth magnet unit

The invention claimed is:

1. A stator module for driving a rotor of an electric planar-drive system, wherein the stator module comprises:
a power module,
a stator assembly disposed on an upper side of the power module, and
a connector;
wherein the power module is embodied to provide drive currents to drive the rotor, the stator assembly comprising coil conductors configured to be charged with the drive currents, the coil conductors of the stator assembly being electrically conductively connected to the power module via the connector for the application of the drive currents,
wherein the power module and the stator assembly are each plate-shaped,
wherein the power module is mechanically fastened to the stator assembly by the connector,
wherein the stator assembly comprises a contact structure with contact holes arranged side by side,
wherein the power module comprises a connecting arrangement having further contact holes arranged side by side,
wherein the connector comprises contact pins arranged side by side, and
wherein the contact pins are arranged to engage in the further contact holes of the connecting arrangement of the power module and in the contact holes of the contact structure of the stator assembly; and further
wherein the stator module comprises a further connector,
wherein said further connector extends in an elongated manner along a first direction and comprises contact pins arranged side by side along said first direction,
wherein said connector extends in an elongated manner along a second direction differing from said first direction, and
wherein the contact pins of the connector are arranged side by side along the second direction.

2. The stator module according to claim 1, wherein the stator assembly is fastened to the power module at a distance from it by the connector in such a way that an installation space for arranging electronic components is formed on the upper side of the power module between the power module and the stator assembly.

3. The stator module according to claim 1, wherein the connector is embodied as a press-fit connector configured to be pressed into the contact holes of the contact structure of the stator assembly.

4. The stator module according to claim 3, wherein the power module comprises a pressing surface at a lower side of the power module opposite to the upper side of the power module, the pressing surface being arranged along the further contact holes and is free of electronic components.

5. The stator module according to claim 1, wherein the first direction and the second direction are perpendicular to each other.

6. The stator module according to claim 1,
wherein the stator assembly comprises further coil conductors to be charged by drive currents,
wherein the coil conductors extends in an elongated manner in the first direction and are arranged side by side in the second direction,
wherein the further coil conductors extends in an elongated manner in the second direction and arranged side by side in the first direction,
wherein the power module for feeding the drive currents into the coil conductors is electrically conductively connected to the coil conductors via the connector extending along the second direction, and
wherein the power module for feeding the further drive currents into the further coil conductors is electrically conductively connected to the further coil conductors via the further connector which extends along the first direction.

7. The stator module according to claim 1,
wherein the power module is cross-shaped having a first bar extending along the first direction and with a second bar extending along the second direction,
wherein the contact pins of the connector are arranged at the second bar along the second direction and connected to the second bar, and
wherein the contact pins of the further connector are arranged at the first bar along the first direction and connected to the first bar.

8. The stator module according to claim 7,
wherein the connector is in the first direction arranged centrally on the second bar, and
wherein the further connector is in the second direction arranged centrally on the first bar.

9. The stator module according to claim 7,
wherein the power module comprises a first module unit and a second module unit embodied separately from the first module unit,
wherein the second bar comprises the first module unit and the first bar comprises the second module unit,
wherein the first module unit is fastened to the stator assembly by the connector, and
wherein the second module unit is fastened to the stator assembly by the further connector.

10. The stator module according to claim 9,
wherein the power module comprises first power-generating units arranged on the first module unit and second power-generating units arranged on the second module unit,
wherein the stator module comprises a control module,
wherein the control module is embodied to generate first control signals for driving the first power-generating units and second control signals for driving the second power-generating units,
wherein the first module unit is connected to the control module via a first coupling element for transmitting the first control signals, and
wherein the second module unit is connected to the control module via a second coupling element for transmitting the second control signals.

11. A stator module for driving a rotor of an electric planar-drive system, wherein the stator module comprises:
a power module,
a stator assembly disposed on an upper side of the power module, and
a connector;
wherein the power module is embodied to provide drive currents to drive the rotor, the stator assembly comprising coil conductors configured to be charged with the drive currents, the coil conductors of the stator assembly being electrically conductively connected to the power module via the connector for the application of the drive currents,
wherein the power module and the stator assembly are each plate-shaped,
wherein the power module is mechanically fastened to the stator assembly by the connector,
wherein the power module is cross-shaped having a first bar extending along the first direction and with a second bar extending along the second direction,
wherein the stator assembly comprises a cross-shaped contact arrangement,
wherein the power module comprises a cross-shaped connecting arrangement,
wherein the connector extends in an elongated manner along the first direction and the second direction, and
wherein the connector is arranged to engage in the connecting arrangement of the power module and in the contact arrangement of the stator assembly.

12. A stator module according to claim 11,
wherein the cross-shaped contact arrangement of the stator assembly comprises with contact holes arranged side by side,
wherein the cross-shaped contact arrangement of the power module comprises further contact holes arranged side by side,
wherein the connector comprises contact pins arranged side by side along the first direction and the second direction, and
wherein the contact pins of the connector are arranged to engage in the further contact holes of the connecting arrangement of the power module and in the contact holes of the contact arrangement of the stator assembly.

13. The stator module according to claim 12, wherein the connector is embodied as a press-fit connector configured to be pressed into the contact holes of the contact arrangement of the stator assembly.

14. The stator module according to claim 13, wherein the power module comprises a pressing surface at a lower side of the power module opposite to the upper side of the power module, the pressing surface being arranged along the further contact holes and is free of electronic components.

15. The stator module according to claim 11, wherein the first direction and the second direction are perpendicular to each other.

16. The stator module according to claim 11,
wherein the connector comprises a first connector and a second connector,
wherein the stator assembly comprises further coil conductors to be charged by drive currents, wherein the coil conductors extends in an elongated manner in the first direction and are arranged side by side in the second direction, wherein the further coil conductors extends in an elongated manner in the second direction and arranged side by side in the first direction, wherein the power module for feeding the drive currents into the coil conductors is electrically conductively connected to the coil conductors via the first connector extending along the second direction, and wherein the power module for feeding the further drive currents into the further coil conductors is electrically conductively connected to the further coil conductors via the second connector which extends along the first direction.

17. The stator module according to claim 11, wherein the connector is in the first direction arranged centrally on the second bar and in the second direction centrally on the first bar.

18. The stator module according to claim 17, wherein the power module comprises a first module unit and a second module unit embodied separately from the first module unit, wherein the second bar comprises the first module unit and the first bar comprises the second module unit, and wherein the first module unit and the second module unit is fastened to the stator assembly by the connector.

19. The stator module according to claim 18, wherein the power module comprises first power-generating units arranged on the first module unit and second power-generating units arranged on the second module unit, wherein the stator module comprises a control module, wherein the control module is embodied to generate first control signals for driving the first power-generating units and second control signals for driving the second power-generating units, wherein the first module unit is connected to the control module via a first coupling element for transmitting the first control signals, and wherein the second module unit is connected to the control module via a second coupling element for transmitting the second control signals.

* * * * *